(12) United States Patent
Kuno

(10) Patent No.: US 10,944,877 B2
(45) Date of Patent: Mar. 9, 2021

(54) IMAGE PROCESSING SYSTEM, IMAGE PROCESSING APPARATUS, AND IMAGE PROCESSING METHOD

(71) Applicant: CANON KABUSHIKI KAISHA, Tokyo (JP)

(72) Inventor: Koichi Kuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/819,248

(22) Filed: Mar. 16, 2020

(65) Prior Publication Data

US 2020/0314258 A1    Oct. 1, 2020

(30) Foreign Application Priority Data

Mar. 29, 2019  (JP) .............................. JP2019-068565

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC ....... *H04N 1/00222* (2013.01); *H04N 1/0071* (2013.01); *H04N 1/00713* (2013.01); *H04N 1/00737* (2013.01)

(58) Field of Classification Search
CPC ............. H04N 1/00222; H04N 1/0071; H04N 1/00713; H04N 1/00737; G06K 15/1868; G06K 15/1825; G06F 15/00

USPC ............................... 358/1.15, 1.13, 1.1, 1.14
See application file for complete search history.

(56) References Cited

U.S. PATENT DOCUMENTS

| 2015/0092224 | A1* | 4/2015 | Hasegawa | H04N 1/444 |
| | | | | 358/1.14 |
| 2017/0244853 | A1* | 8/2017 | Yabuuchi | H04N 1/0044 |
| 2018/0343354 | A1* | 11/2018 | Tsuji | H04N 1/40062 |

FOREIGN PATENT DOCUMENTS

| JP | 2005-148928 A | 6/2005 |
| JP | 4310172 B2 | 8/2009 |

* cited by examiner

*Primary Examiner* — Douglas Q Tran
(74) *Attorney, Agent, or Firm* — Venable LLP

(57) ABSTRACT

The image processing apparatus adds a first image that includes a predetermined image feature, to a read image of the document based on a detection result in the detecting, and transmits a second image of the predetermined image size specified in the read instruction, to the information processing apparatus. The information processing apparatus obtains the read image of the document included in the second image transmitted in the transmitting. The image processing apparatus adds the first image such that in the second image the first image is provided on the outside of the read image of the document, based on at least one of a width and a height of the document detected in the detection. The information processing apparatus obtains the read image of the document based on the predetermined image feature.

21 Claims, 17 Drawing Sheets

FIG. 18

|     | 0 | 1 | 2 | 3 | 4 | (X%5) |
|-----|---|---|---|---|---|-------|
| 0   | a | b | c | d | e |       |
| 1   | f | g | h | i | j |       |
| 2   | k | l | m | n | o |       |
| 3   | p | q | r | s | t |       |

|    | 0 | 1 | 2 | 3 | 4 | 5 | 6 | 7 | 8 |
|----|---|---|---|---|---|---|---|---|---|
| 0  |   |   |   |   |   |   |   | c | d |
| 1  |   |   |   |   |   |   |   | h | i |
| 2  |   |   |   |   |   |   |   | m | n |
| 3  |   |   |   |   | t |   |   | r | s |
| 4  |   |   |   |   |   |   |   | c | d |
| 5  |   |   |   |   |   |   |   | h | i |
| 6  |   |   |   |   |   |   |   | m | n |
| 7  |   |   |   |   |   |   |   | r | s |
| 8  |   |   |   |   |   |   |   | c | d |
| 9  |   |   |   |   |   |   |   | h | i |
| 10 | k | l | m | n | o | k | l | m | n |
| 11 | p | q | r | s | t | p | q | r | s |
| 12 | a | b | c | d | e | a | b | c | d |

IMAGE PROCESSING SYSTEM, IMAGE PROCESSING APPARATUS, AND IMAGE PROCESSING METHOD

BACKGROUND OF THE INVENTION

Field of the Invention

The present invention relates to an image processing system and an image processing apparatus that can read a document, and an image processing method for making it possible to read a document.

Description of the Related Art

Drivers that are implemented in information processing apparatuses include a vendor driver that is provided by a vendor, which itself provides an image processing apparatus. The vendor driver complies with standards, but can include original processing incorporated therein. For example, the image processing apparatus can transmit information regarding a document size detected by the image processing apparatus, to an application program of the information processing apparatus through original processing of the vendor driver. For example, by using information regarding a document size, the application program can automatically scan and copy a document based on the document size without the user specifying a document size. However, due to security problems in recent years, a shortened OS upgrade period, and the like, there are more and more cases where a standard driver prepared by an OS manufacturer, not a vendor driver is used, and the standard driver directly controls the image processing apparatus. In a standard driver, only basic functions are implemented, and functions unique to the vendor are not supported.

Methods for extending functions while using a standard driver have been proposed, and Japanese Patent No. 4310172 discloses a method in which an extension interface for a device driver and an application to transmit and receive setting information unique to the device driver is realized by an interface of an operating system, and a setting screen on which settings that are based on the setting information unique to the device driver can be made is displayed.

On the other hand, regarding the above-mentioned detection of a document size, methods for obtaining an image of a document scanned to a size larger than the document, such as the size of the entire surface of the document stage, and detecting a document portion through image analysis are known.

The extension interface in Japanese Patent No. 4310172 is configured as another program that is not defined within standards. Therefore, in implementation of an application program that uses a standard driver, in order to detect a document size without configuring another program, it is conceivable that read data acquired by scanning a document to a size larger than the document is obtained as described above, and a document region is detected though image analysis. However, there is a possibility that the accuracy at which a document region is detected in the information processing apparatus through image analysis is lower than the accuracy at which a document region is detected in the image processing apparatus.

SUMMARY OF THE INVENTION

The present invention provides an image processing system, an image processing apparatus, and an image processing method for appropriately detecting a document region from read data.

The present invention in one aspect provides an image processing method that is performed by an information processing apparatus and an image processing apparatus, the image processing method comprising: reading, by the image processing apparatus, a document when a read instruction in which a predetermined image size is specified is received from the information processing apparatus; detecting, by the image processing apparatus, at least one of a width and a height of the document; adding, by the image processing apparatus, a first image that includes a predetermined image feature, to a read image of the document based on a detection result in the detecting; transmitting, by the image processing apparatus, a second image of the predetermined image size specified in the read instruction, to the information processing apparatus; and obtaining, by the information processing apparatus, the read image of the document included in the second image transmitted in the transmitting, wherein, in the adding, the image processing apparatus adds the first image such that in the second image the first image is provided on the outside of the read image of the document , based on at least one of a width and a height of the document detected in the detection, and in the obtaining, the information processing apparatus obtains the read image of the document based on the predetermined image feature.

According to the present invention, a document region can be appropriately detected from read data.

Further features of the present invention will become apparent from the following description of exemplary embodiments with reference to the attached drawings.

BRIEF DESCRIPTION OF THE DRAWINGS

FIG. 18 is a diagram showing a specific pattern.

FIG. 19 is a diagram showing a scanning result when a document is placed and scanned.

DESCRIPTION OF THE EMBODIMENTS

Figure 1:
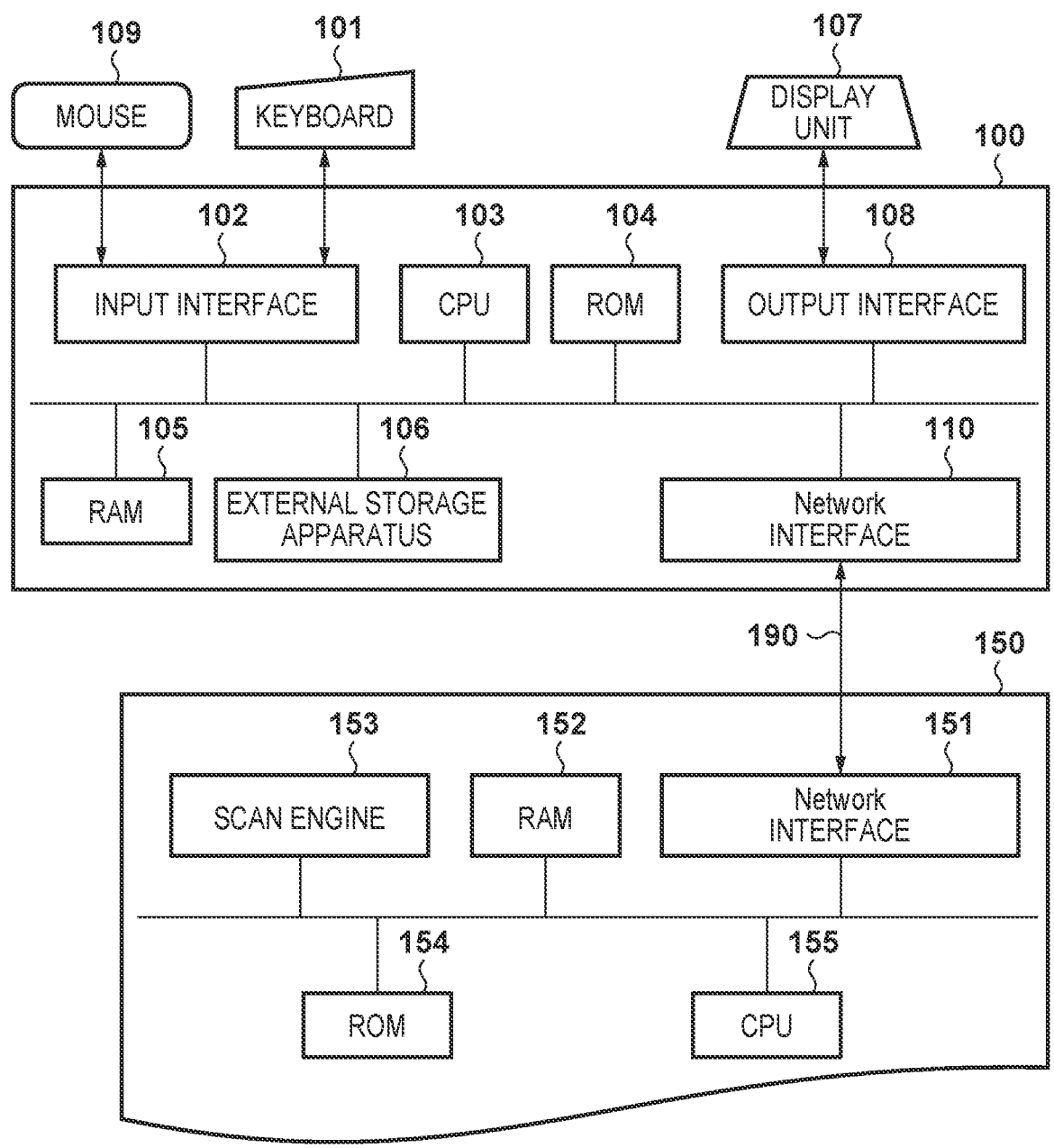
FIG. 1 is a diagram showing a configuration of an image processing system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a diagram showing a configuration of an image processing system in this embodiment. As shown in FIG. 1, the image processing system includes an image processing apparatus 150 and an information processing apparatus 100. In this embodiment, the information processing apparatus 100 is a PC, for example, and the image processing apparatus 150 is a scanner, for example. The image processing apparatus 150 may also be configured as an MFP (Multi-functional Peripheral) in which a plurality of functions are integrated, for example.

The information processing apparatus 100 includes an input interface 102, a CPU 103, a ROM 104, a RAM 105, an external storage apparatus 106, an output interface 108, a display unit 107, a keyboard 101, a mouse 109, and a network interface 110. The CPU 103 integrally controls the information processing apparatus 100. The network interface 110 and the image processing apparatus 150 are connected via a network cable 190 so as to be mutually communicable. In FIG. 1, the network is illustrated as the network cable 190, but may be a network such as a LAN with a router, a hub, and the like, and, the network interface 110 and the image processing apparatus 150 may also be configured to be mutually communicable via a wired or wireless medium.

The ROM 104 is a read-only memory, and stores, for example, an initializing program. The external storage apparatus 106 stores an OS (Operating System), an application program 200, a standard library 201, and a vendor driver 210 in FIG. 2, a standard driver 310 in FIG. 3, and other various types of data. The RAM 105 is a readable/recordable memory, and, when the RAM 105 is used as a work memory, various programs stored in the external storage apparatus 106 are loaded to the RAM 105. An operation of the information processing apparatus 100 in this embodiment is realized, for example, by a program stored in the ROM 104 being loaded to the RAM 105, and executed.

The image processing apparatus 150 includes a network interface 151, a RAM 152, a scan engine 153, a ROM 154, and a CPU 155. The CPU 155 integrally controls the image processing apparatus 150. The network interface 151 and the information processing apparatus 100 are connected to via the network cable 190 so as to be mutually communicable. The RAM 152 is used as a main memory and a work memory of the CPU 155, and, for example, stores various types of data for processing a received scan job. An operation of the image processing apparatus 150 in this embodiment is realized, for example, by a program stored in the ROM 154 being loaded to the RAM 152, and executed.

The scan engine 153 performs a scanning operation based on a scan job stored in the RAM 152. The scan engine 153 (scanner) includes an optical sensor for performing a scanning operation, a motor that drives the sensor, and the like. The scan engine 153 may be configured to scan a document placed on a document stage (not illustrated) by driving the sensor, or may be configured as an auto document feeder (ADF) that automatically feeds a document to be scanned. Also, if configured as an ADF, the scan engine 153 may be configured as a single-sided ADF that reads only one side of a document, or a two-sided ADF that simultaneously reads two sides of a document using two optical sensors.

In this embodiment, as an example, the information processing apparatus 100 and the image processing apparatus 150 are configured as described above, but another functional block is included as appropriate according to functions of the apparatuses.

Figure 2:
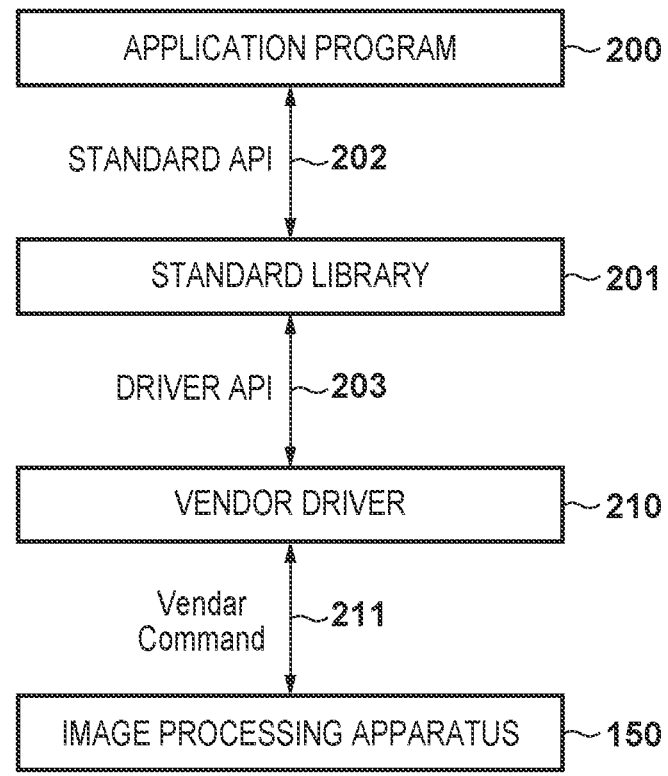
FIG. 2 is a diagram showing a configuration of software in an information processing apparatus.
Figure 3:
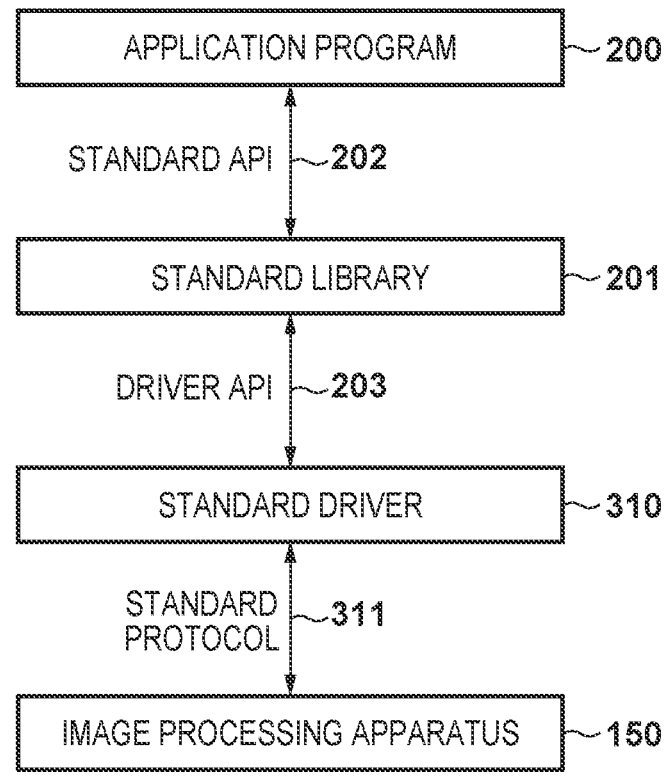
FIG. 3 is a diagram showing a configuration of software in the information processing apparatus.

FIGS. 2 and 3 are diagrams showing an example of a configuration of software in the information processing apparatus 100. The information processing apparatus 100 is controlled by the above-mentioned OS, and the application program 200 operates on the OS. The application program 200 has a function of obtaining image data from the image processing apparatus 150 and storing the image data.

The application program 200 can access the image processing apparatus 150 that is a scanner or the like, in accordance with standards stipulated by the OS manufacturer or a standardization body. When the application program 200 accesses the image processing apparatus 150 in accordance with standards, an application program interface defined in the standards (hereinafter, a standard API 202) is used.

When the application program 200 accesses the image processing apparatus 150, the standard library 201 included in the OS is incorporated into the application program 200, and the standard API 202 defined therein is called. The standard library 201 of the OS loads a driver corresponding to the image processing apparatus 150 in response to the standard API 202 being called. The driver accesses the image processing apparatus 150 and realizes a desired operation, according to a function requested by a driver API 203.

The driver may be the vendor driver 210 as shown in FIG. 2, the vendor driver 210 having been created and provided by a vendor, or may be the standard driver 310 that accesses the image processing apparatus 150 in accordance with a standard protocol 311 as shown in FIG. 3, the standard driver 310 having been created by an OS manufacturer and included in the OS. In this embodiment, it is assumed that the standard driver 310 is a driver created by an OS manufacturer, but may be a driver that has not been created by an OS manufacturer but complies with the standards. In addition, in this embodiment, if the standard API 202 and the standard driver 310 are integrated and there is no driver, the configuration in this case is handled in a similar manner when seen from the application program 200.

There is no difference between the vendor driver 210 shown in FIG. 2 and the standard driver 310 shown in FIG. 3, when seen from the application program 200, in a range where standard functions are implemented. Here, when the application program 200 improves the user-friendliness in control of the image processing apparatus 150 provided in accordance with OS standards, and realizes upgrading of their functions, the vendor can issue a Vendor Command 211 unique to the vendor by originally extending the vendor driver 210 shown in FIG. 2, and the application program 200 can use the issued Vendor Command 211.

On the other hand, in the case of the standard driver 310 shown in FIG. 3, only the standard protocol 311 is implemented on the image processing apparatus 150 side as well, and a command unique to the image processing apparatus 150 cannot be executed. When the application program 200 attempts to call a function extended in the vendor driver 210, it is ignored by the standard driver 310, or an error is returned.

Figure 4:
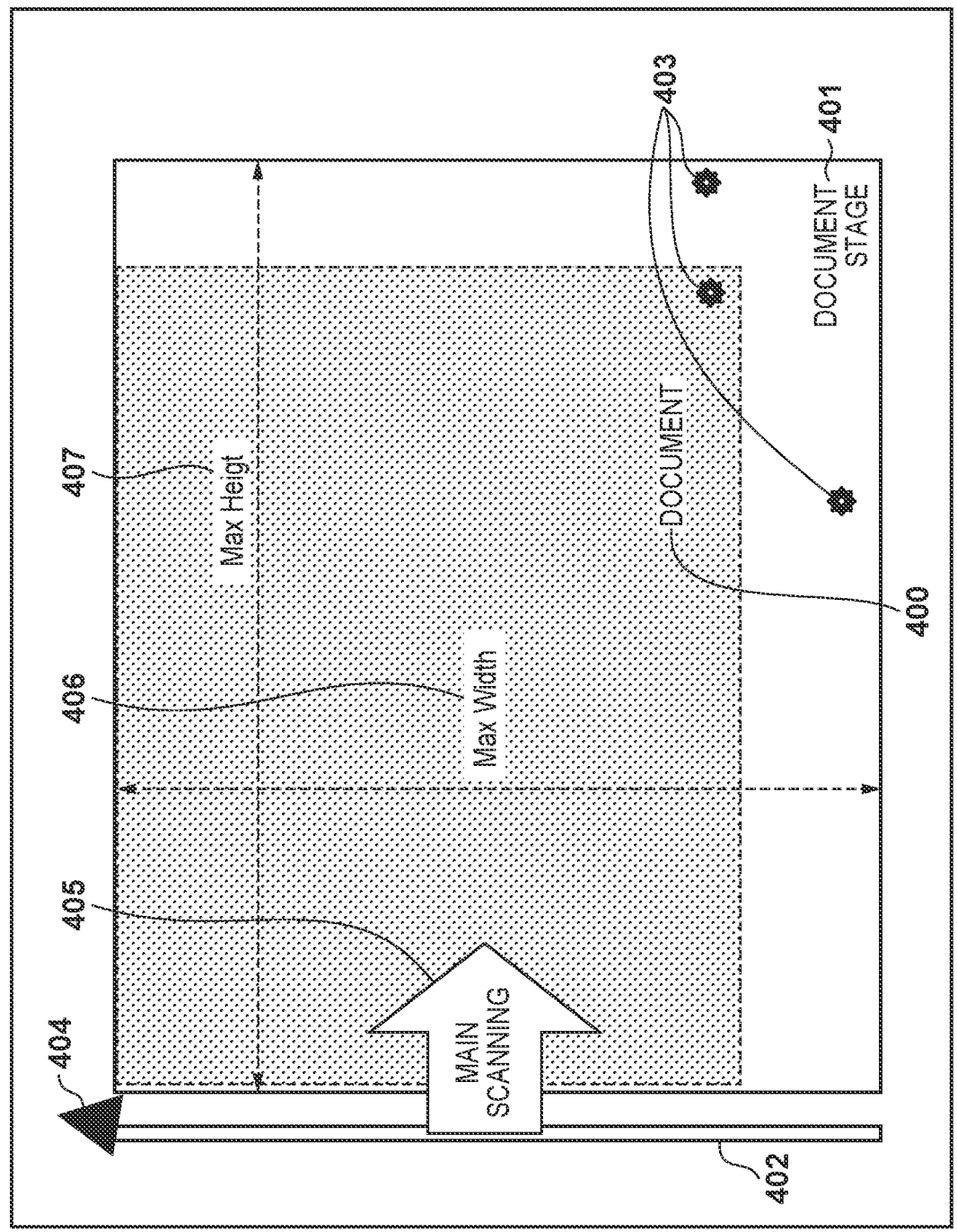
FIG. 4 is a diagram showing a state where a document is placed on a document stage.

FIG. 4 is a diagram showing a configuration in which a document 400 is placed on a document stage 401 and is scanned in the image processing apparatus 150, when viewed from above. The document 400 is placed on the document stage 401. In FIG. 4, the document 400 is set to be in contact with an abutting portion 404. In FIG. 4, the abutting portion 404 is illustrated as being located at the left back of the image processing apparatus 150, but may be located at one of the four edges. The document stage 401 is made of a transparent material such as glass, and a scanner sensor 402 reads a document while moving in a main scanning direction 405. A document is read in a state were a document stage cover (not illustrated) such as a lid that covers the document stage 401 is closed. In most cases, the document stage cover is smooth and white in order to reduce the influence on the color of scan data that is to be obtained by performing a scanning operation.

A readable range is determined according to the width of the scanner sensor 402 and the size of the document stage 401. In FIG. 4, a maximum width (Max Width) 406 and a maximum height (Max Height) 407 of the entire surface of the document stage 401 represent a readable range. In addition, besides the scanner sensor 402 that scans the document 400, document detection sensors 403 that detect only whether or not a document is present at specific positions are included. It suffices for the document detection sensors 403 to be capable of discerning whether or not a document is located at specific positions, and the document detection sensors 403 do not need to be configured to detect visible light. For example, each of the document detection sensors 403 may be a sensor whose photo receiving portion is directed on the document stage cover side, so as to detect whether light is blocked by a document. The document detection sensors 403 are installed at a plurality of positions of the document stage 401, and a final regular document size can be determined based on a combination of detection results on whether or not the document 400 is present at the respective positions.

Figure 5:
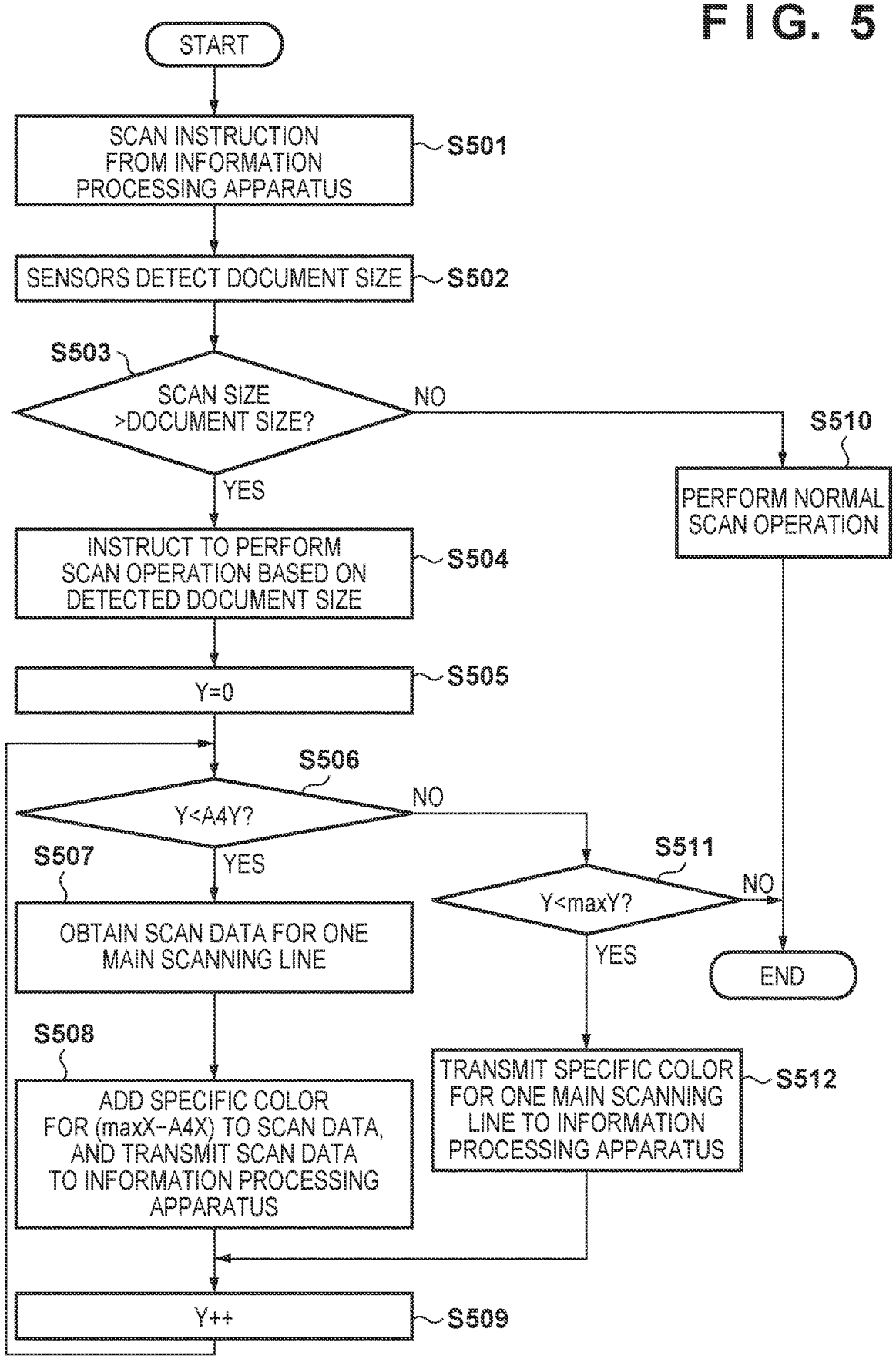
FIG. 5 is a flowchart showing processing of an image processing apparatus.

FIG. 5 is a flowchart showing processing of the image processing apparatus 150 in this embodiment. The processing in FIG. 5 is realized, for example, by the CPU 155 loading a program stored in the ROM 154 to the RAM 152, and executing the program.

In step S501, the CPU 155 receives a scan request (read instruction) from the application program 200 that operates in the information processing apparatus 100. In this read instruction, an image size of an image to be scanned (a scan request size) is specified by the application program 200. Here, as an example of the scan request size, a start position (x,y)=(0,0) and a width and height (width,height)=(maxX, maxY) are specified. In addition, at this time, the document 400 is placed on the document stage 401 of the image processing apparatus 150. MaxX corresponds to the above-mentioned MaxWidth, and MaxY corresponds to the above-mentioned MaxHeight.

In step S502, the CPU 155 causes the document detection sensors 403 to detect a document size, and, in step S503, determines whether or not the scan request size is larger than the document size. Here, if the scan request size is smaller than or equal to the document size, the CPU 155 performs a normal scan operation in step S510, and then ends the processing in FIG. 5. On the other hand, if the scan request size is larger than the document size, the procedure advances to step S504.

In step S504, the CPU 155 gives an instruction to perform a scan operation based on the document size detected by the document detection sensors 403. In step S505, the CPU 155 keeps, in a storage region, a variable Y representing a coordinate in the main scanning direction 405 (corresponding to the height), and initializes the variable Y to 0. From this point, the processes in steps S507 to S508 are repeated until the variable Y reaches the height of the detected document size (as an example, A4Y of the A4 size).

In step S506, if it is determined that the current value of the variable Y is smaller than A4Y, the CPU 155 obtains scan data (read data) for one main scanning line of the document size in step S507. Then, in step S508, the CPU 155 adds, to the scan data obtained in step S507, image data of a specific color having a width corresponding to the difference between maxX and the width of the document size (additional image data), and transmits, to the information processing apparatus 100, the scan data to which the image data has been added. At this time, the transmission is performed to the standard driver 310 in accordance with a standard protocol. The specific color will be described later. After step S508, in step S509, the CPU 155 increments the value of the variable Y, and repeats the process in step S506.

If it is determined in step S506 that the current value of the variable Y is larger than or equal to A4Y, the procedure advances to step S511, and the CPU 155 determines whether or not the current value of the variable Y is smaller than maxY. Here, if it is determined that the current value of the variable Y is smaller than maxY, data of the specific color for one main scanning line is transmitted to the information processing apparatus 100 in step S512. At this time, the transmission is performed to the standard driver 310 in accordance with a standard protocol. After step S512, the process in step S509 is performed. If it is determined in step S511 that the current value of the variable Y is larger than or equal to maxY, the processing in FIG. 5 is ended.

Note that a configuration may also be adopted in which the CPU 155 can discern whether the scan instruction received in step S501 has been issued by the vendor driver 210 or the standard driver 310, based on the protocol used for the scan instruction, and the like. In this case, the processing in FIG. 5 may be executed when a scan instruction is issued by the standard driver 310. On the other hand, when a scan instruction is issued by the vendor driver 210, the CPU 155 may perform notification of a detection result of sensors detecting a document region, using a particular command that can be received in accordance with a protocol used by the vendor driver 210.

Here, the specific color will be described. Basically, it suffices for the specific color to be a color that is unlikely to be continuously exhibited as a result of a scanner performing a scan operation without a document being placed. In other words, it is sufficient that the information processing apparatus 100 can discern the specific color from the color of a member that covers the document stage when the cover of the document stage is closed. For example, in this embodiment, 100% pure white is set as the specific color. 100% pure white is represented by pixel values of R=255, G=255, and B=255 in the case of 8-bit RGB. This is because a case is envisioned in which, in the information processing apparatus 100, an output result that includes the specific color is used as is without performing processing for extracting data of the document size. Accordingly, as described above, an extreme pattern and texture with a large difference from the color of the member that covers the document stage increases the accuracy at which a document region is extracted in the information processing apparatus 100. Note that, on the other hand, such a pattern and texture does not provide a result that is desired by the user, since the difference from the color of the member that covers the document stage is conspicuous when a document region is not extracted. Therefore, it is desirable that the specific color of the additional image data is set to be a color that is envisioned to be distinguishable from a region in which a document is not placed (a region in which the document stage cover is to be scanned), and to be close to the color of the region. In addition, usually, pure white is less likely to be output as a result of a scan operation, depending on a configuration of a scanner. This is because, in a configuration in which pure white is exhibited, saturation is likely to occur to lose information, and thus a configuration for reducing output of pure white is usually adopted. Furthermore, it depends on features of a scan result. Features of a scan result will be described with reference to FIGS. 8 to 10.

Figure 8:
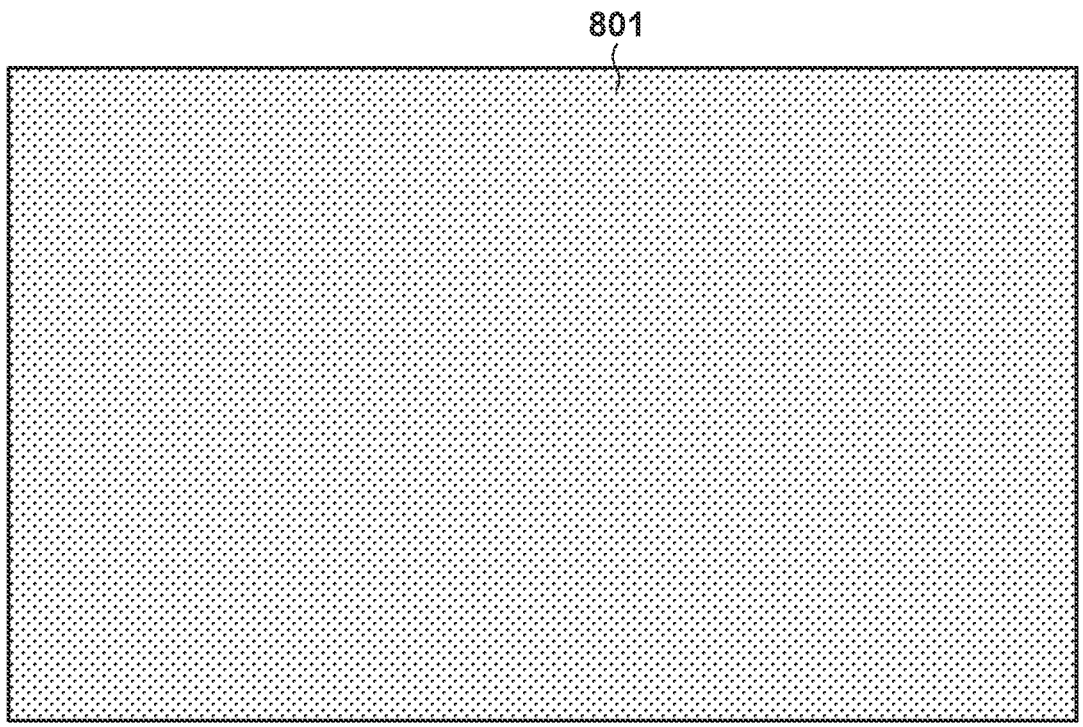
FIG. 8 is a diagram showing a scanning result when only a document stage cover is scanned.

FIG. 8 is a diagram showing a scanning result when only the document stage cover is scanned without the document 400 being placed. FIG. 8 shows a scanning result 801 of scanning the document stage cover, but the resolution of the scanner exceeds the smoothness of the document stage cover of the scanner, and thus, as a result, a light grayscale image caused by the difference in the smoothness of the document stage cover is output. Furthermore, a result different from that of pure white is output due to noise caused by a soil, dust, and dirt on the document stage cover as well.

Figure 9:
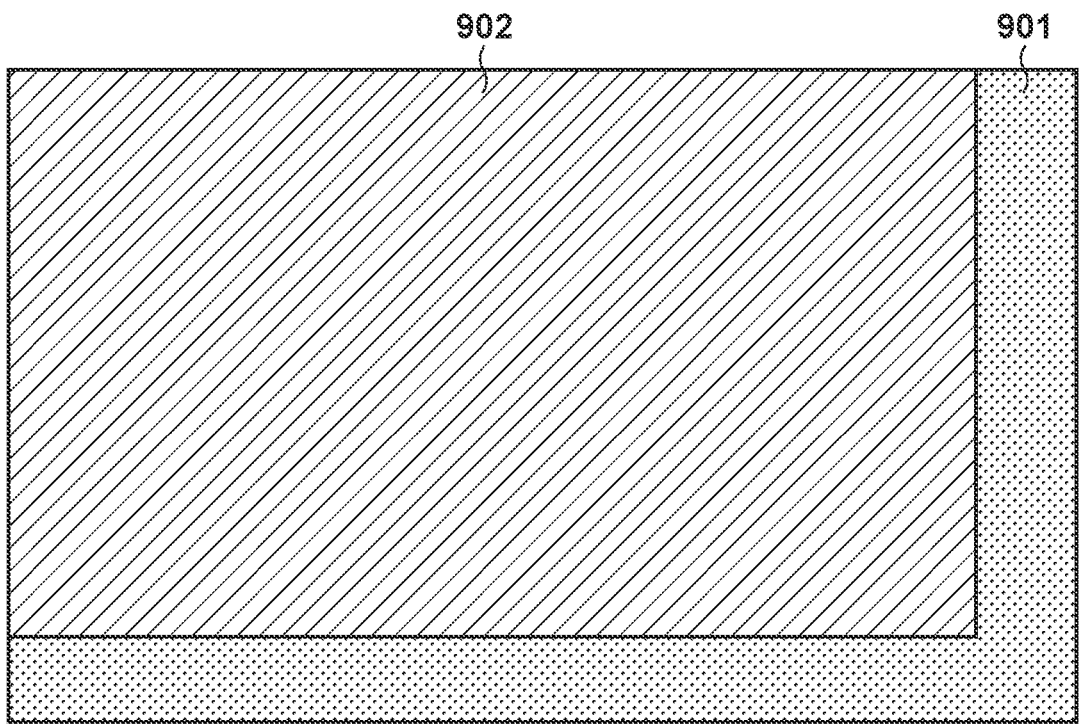
FIG. 9 is a diagram showing a scanning result when a document is placed and scanned.

FIG. 9 is a diagram showing a scanning result when the document 400 is placed and scanned. FIG. 9 shows a document portion, which may actually include various contents, but no matter how white the paper that is placed may be, shading caused by the difference in thickness of the paper is often exhibited lightly in a scanning result, as shown in a region 902. In addition, similarly to FIG. 8, regarding the document stage cover portion, shading indicated as a region 901 appears. Accordingly, the scanning result is characterized that a region wholly represented in pure white is unlikely to occur.

Figure 10:
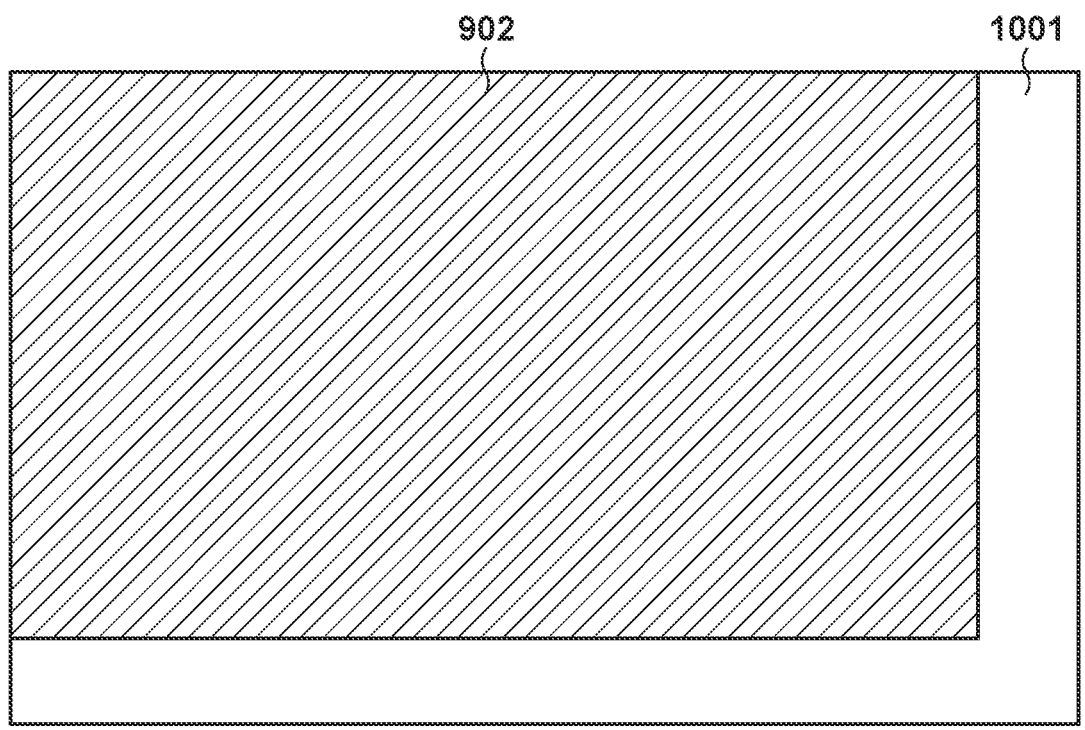
FIG. 10 is a diagram showing a scanning result output through the processing in FIG. 5.

On the other hand, FIG. 10 is a diagram showing a scanning result output through the processing in FIG. 5. A region 1001 is set to the specific color in steps S508 and S512 of the image processing apparatus 150, and thus is a region of continuous pure white since components of shading as shown in FIGS. 8 and 9 do not appear. Therefore, it is possible to distinguish the additional image data of pure white shown in FIG. 10 and the image data of the region 901 in FIG. 9 from each other.

Figure 6:
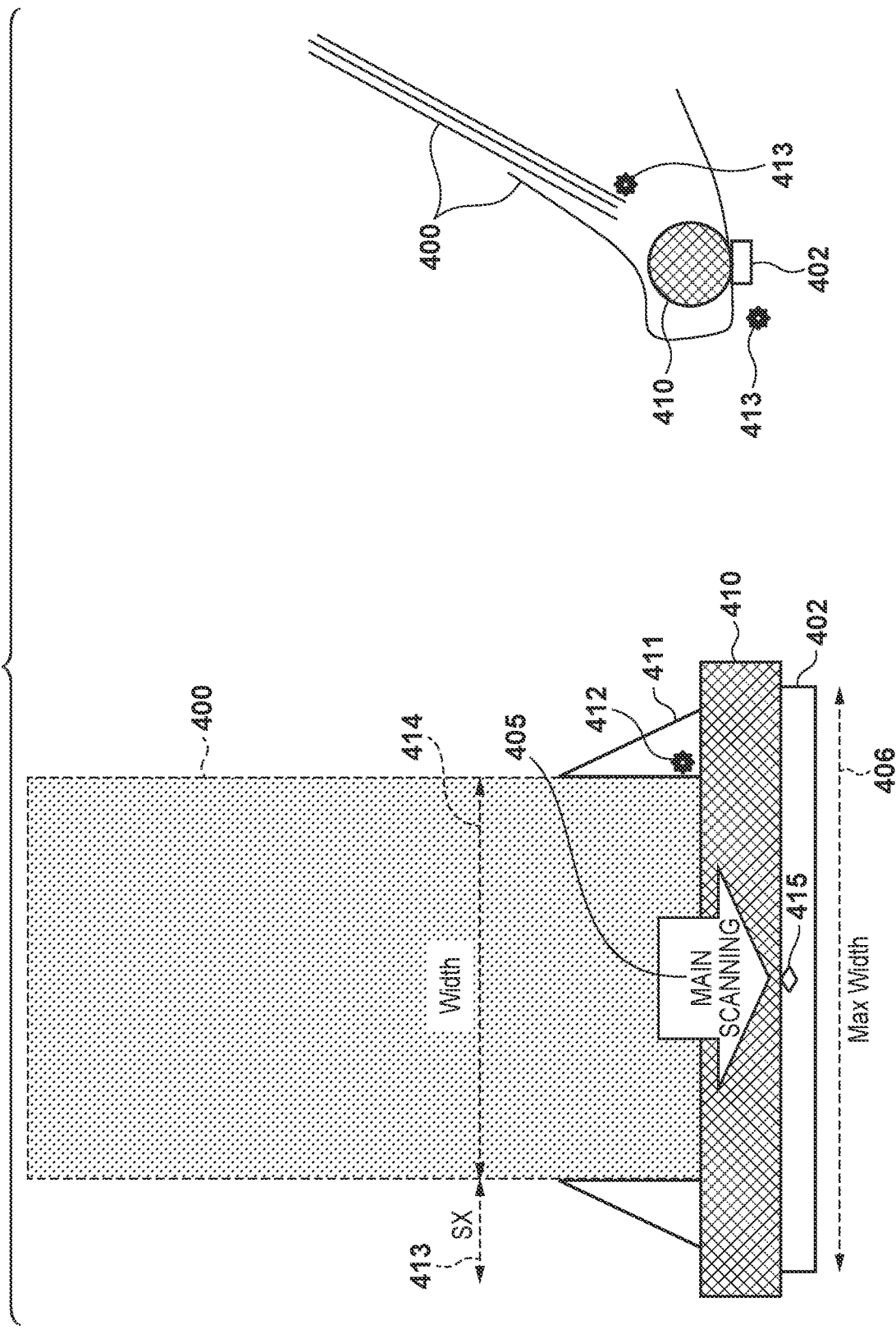
FIG. 6 is a diagram showing a configuration of an ADF.

FIG. 6 is a diagram showing a configuration of an ADF that automatically feeds a document, in the image processing apparatus 150. In the configuration of the ADF, the scanner sensor 402 is fixed, and scans the document 400 as a result of the document 400 being moved using a document feeding roller 410. The position of the document 400 is adjusted using a pair of document guides 411. As shown in FIG. 6, the document guides 411 are configured to be adjusted to the width of the document 400 from its two sides, but a configuration may also be adopted so as to be adjusted to the width only from one side. A document width sensor 412 detects the lateral width of the installed document 400 (document width). As a method for detecting a document width, another configuration may be used, and a configuration may also be adopted in which several sensors for determining whether or not there is a document are installed at a feeding inlet, and a width is detected based on the determination results, or the positions of the document guides 411 themselves can be detected as a width.

In the case of the configuration of the ADF, a document in the ADF is placed by being inserted into a document inlet, and there is no sensor for the trailing edge of the document in this state. Therefore, in the case of the configuration of the ADF, a document width can be detected, but the height of a document cannot be detected before a scan operation. An actual height of a document can be obtained when a scan operation is performed and the document detection sensors 403 of the ADF detect completion of feeding of one page of the document. Therefore, a configuration may also be adopted in which, when it is desired to determine a document size before performing a scan operation, a corresponding regular document size is presumed from the lateral width before starting a scan operation, and the presumed size is obtained as a detected size. In addition, in the case of the configuration using the ADF, a configuration can be adopted in which a document detection sensor that can discern whether or not reading of a document to its trailing edge is complete is provided, and it is understood that the trailing edge of the document of a page indicates a state where the document of this page has left the ADF. Therefore, a configuration may also be adopted in which the number of read lines until the document has left the ADF is obtained as the height of the document.

Figure 7:
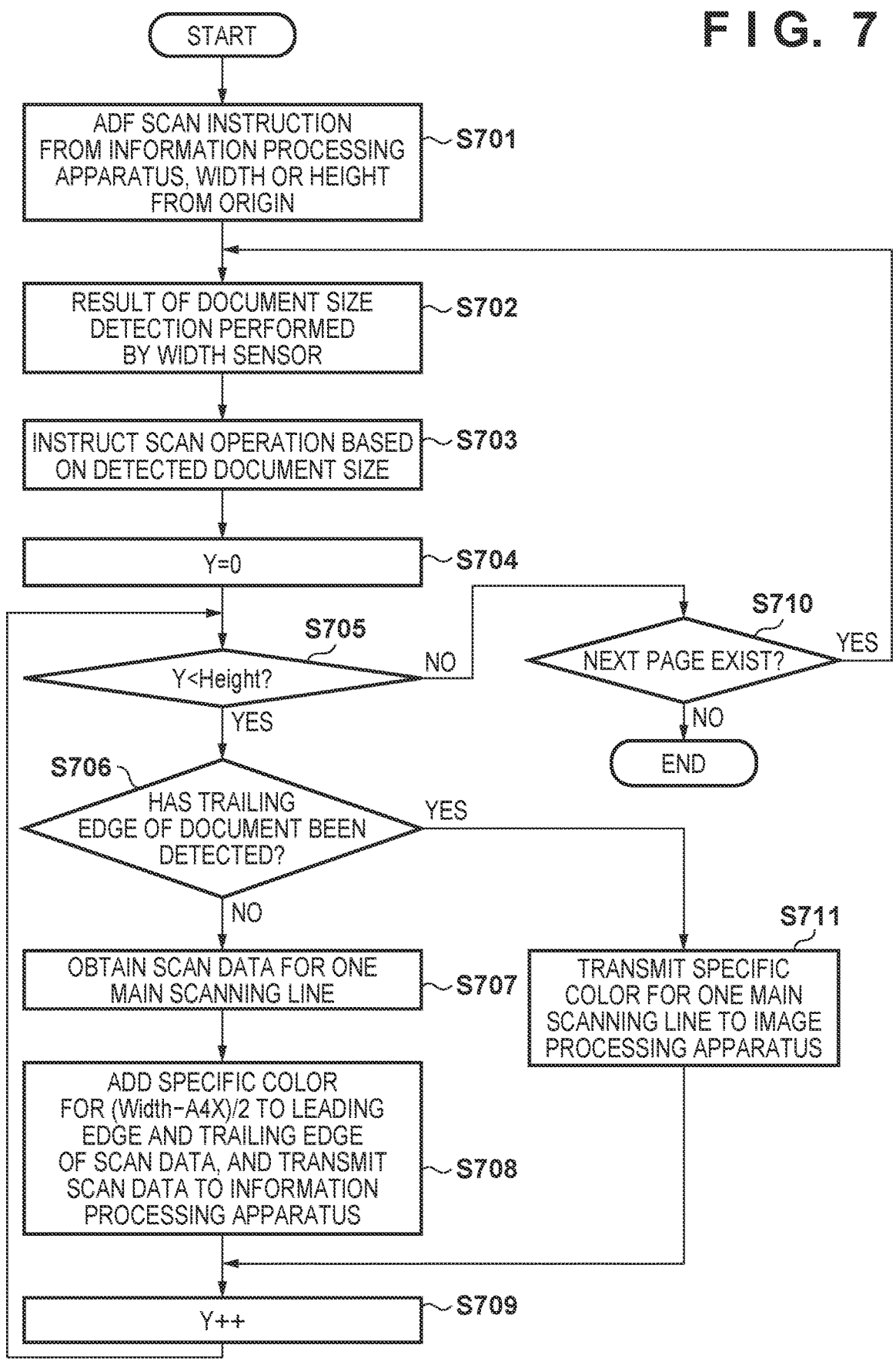
FIG. 7 is a flowchart showing processing of the image processing apparatus.

FIG. 7 is a flowchart showing processing of the image processing apparatus 150 in the case of the configuration using the ADF shown in FIG. 6. The processing in FIG. 7 is realized, for example, by the CPU 155 loading a program stored in the ROM 154 to the RAM 152 and executing the program.

In step S701, the CPU 155 receives a scan request (read instruction) given by the ADF, from the application program 200 that operates in the information processing apparatus 100. Here, assume that a width=Max width (corresponding to the width 406 in FIG. 6) is specified as an example of a scan request. In addition, at this time, the document 400 is set in the ADF of the image processing apparatus 150.

In step S702, the CPU 155 causes the document width sensor 412 to detect a document size (width), and, in step S703, gives an instruction to scan the document based on the document size detected by the document width sensor 412. Here, assume that the detected document size is A4X (A4X<Max width) that corresponds to the A4 size.

In step S704, the CPU 155 stores, in the storage region, a variable Y indicating a coordinate in the main scanning direction 405 (height), and initialize the variable Y to 0. From this point, the processes in steps S706 to S708 are repeated until the variable Y reaches Height. Here, Height represents a regular document size corresponding to the above-described lateral width, for example.

In step S705, if it is determined that the current value of the variable Y is smaller than Height, the CPU 155 determines in step S706 whether or not the trailing edge of the document has been detected by any of the document sensors 403. Here, if it is determined that the trailing edge of the document has not been detected, the procedure advances to step S707, and the CPU 155 obtains scan data for one main scanning line of the document size (read data). Then, in step S708, the CPU 155 adds data of a specific color having a width of (Max width-A4X)/2 (additional data) to the scan data obtained in step S707, to each of the two edges sandwiching a central point 415 in FIG. 6. The CPU 155 then transmits, to the information processing apparatus 100, the scan data to which the additional data has been added. After step S708, in step S709, the CPU 155 increments the value of the variable Y, and the process in step S705 is repeated.

If it is determined in step S706 that the trailing edge of the document has been detected, the procedure advances to step S711, and the CPU 155 transmits data of the specific color for one main scanning line, to the information processing apparatus 100. After step S711, the process in step S709 is performed.

If it is determined in step S705 that the current value of the variable Y is larger than or equal to Height, the procedure advances to step S710, and the CPU 155 causes document detection sensors to determine whether or not there is a next page. If it is determined in step S710 that there is no next page, the processing in FIG. 7 is ended, and, if it is determined that there is a next page, the process in step S702 is repeated.

Note that, if the ADF of the image processing apparatus 150 does not include the document width sensor, and a document width cannot be detected but a document height can be detected by the document detection sensors, a lateral width may be presumed based on a regular size corresponding to the document height.

Figure 11:
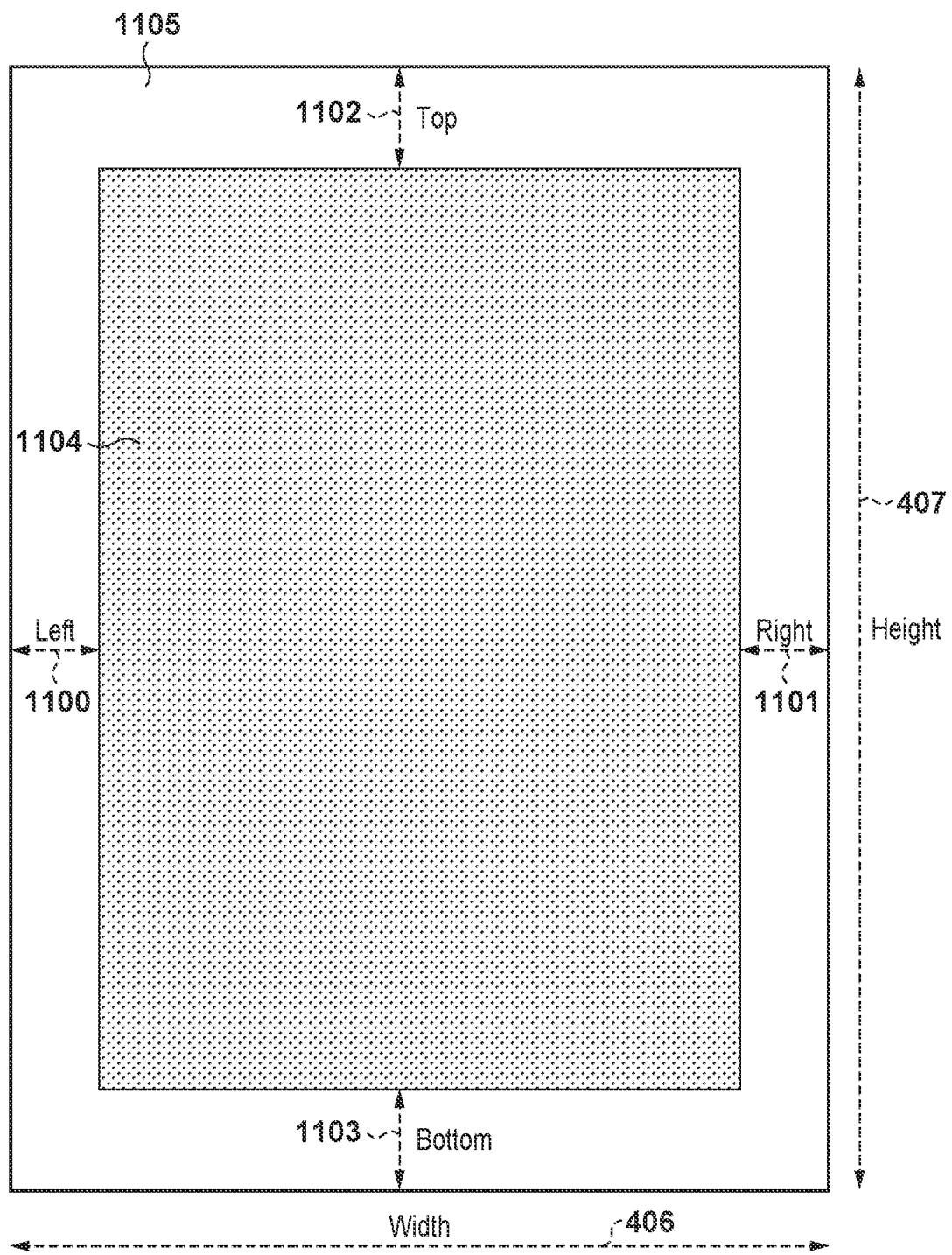
FIG. 11 is a diagram showing a scanning result transmitted to the information processing apparatus.

FIG. 11 is a diagram showing an example of a scanning result transmitted to the information processing apparatus 100 through the processing in FIG. 5 and the processing in FIG. 7. In FIG. 11, a hatched region 1104 indicates a scanning result of the document 400 (document region). If the document 400 is placed to abut against the abutting portion in the configuration in FIG. 4, document size detection is performed at one of an upper position and a lower position and one of a right position and a left position. In that case, there are not all of four margin regions, which are regions other than the document region, and are respectively identified by an amount of Top margin 1102, an amount of Bottom margin 1103, an amount of Left margin 1100, and an amount of Right margin 1101, as shown in FIG. 11, and there are only two adjacent margin regions. Of course, which two margin regions are present depends on the position of the abutting portion. In addition, in the case of the configuration of the ADF in FIG. 6, the amount of Top margin 1102 is always 0, and, when the document 400 is placed centered on the central point 415, there are three margin regions respectively identified by the amount of Left margin 1100, the amount of Right margin 1101, and the amount of Bottom margin 1103. In this manner, although the way margin regions exist differs according to various modes, FIG. 11 shows all of the four margin regions mentioned above to facilitate description of operations of this embodiment. In an actual configuration, all four blank regions are not taken into consideration, and one or more margin regions are taken into consideration according to a configuration (the configuration in FIG. 4 or the configuration in FIG. 6) and the position of the abutting portion.

Figure 12:
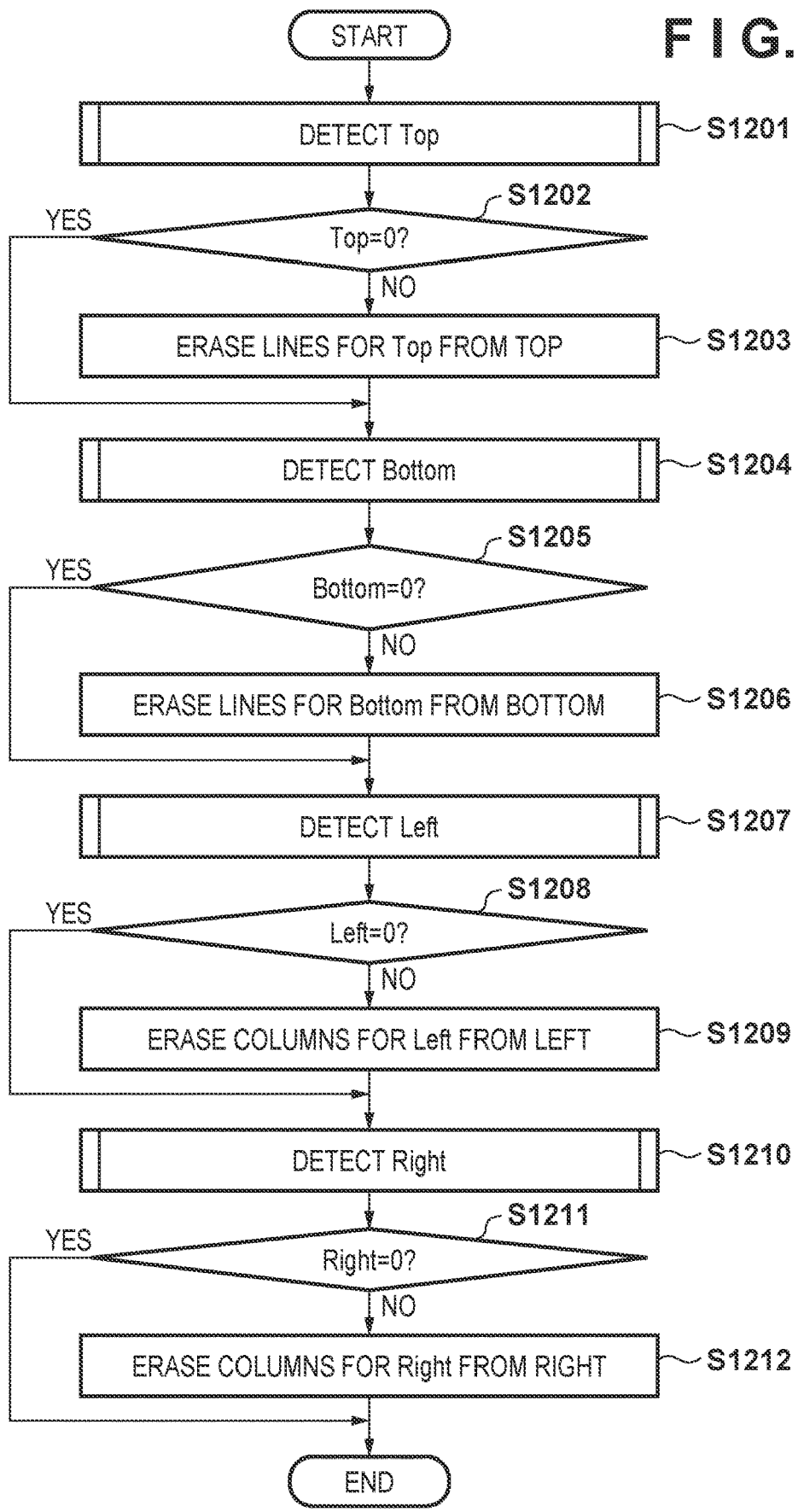
FIG. 12 is a flowchart showing processing of the information processing apparatus.

FIG. 12 is a flowchart showing processing that is performed by the information processing apparatus 100. Note that the processing in FIG. 12 is realized by a program included in the application 200. For example, the processing in FIG. 12 is realized by the CPU 103 loading a program stored in the ROM 104 and included in the application 200 to the RAM 105, and executing the program. The processing in FIG. 12 is started when the information processing apparatus 100 receives all of scanning results from the image processing apparatus 150. The information processing apparatus 100 detects a document size detected by the image processing apparatus 150, and outputs a scan result of the document size based on the detection result.

In step S1201, the CPU 103 obtains the amount of Top margin 1102, and determines in step S1202 whether or not the amount of Top margin 1102 is 0. The process in step S1201 will be described later. Here, if it is determined that the amount of Top margin 1102 is 0, the procedure advances to step S1204. On the other hand, if it is determined that the amount of Top margin 1102 is not 0, the CPU 103 erases rows for the amount of Top margin 1102 in the scanning result in FIG. 11 from its upper edge in step S1203, and the procedure advances to step S1204.

In step S1204, the CPU 103 obtains the amount of Bottom margin 1103, and determines in step S1205 whether or not the amount of Bottom margin 1103 is 0. The process in step S1204 will be described later. Here, if it is determined that the amount of Bottom margin 1103 is 0, the procedure advances to step S1207. On the other hand, if it is determined that the amount of Bottom margin 1103 is not 0, the CPU 103 erases rows for the amount of Bottom margin 1103 in the scanning result in FIG. 11 from its lower edge in step S1206, and the procedure advances to step S1207.

In step S1207, the CPU 103 obtains the amount of Left margin 1100, and, determines in step S1208 whether or not the amount of Left margin 1100 is 0. The process in step S1207 will be described later. Here, if it is determined that the amount of Left margin 1100 is 0, the procedure advances to step S1210. On the other hand, if it is determined that the amount of Left margin 1100 is not 0, the CPU 103 erases columns for the amount of Left margin 1100 in the scanning result in FIG. 11 from its left edge in step S1209, and the procedure advances to step S1210.

In step S1210, the CPU 103 obtains the amount of Right margin 1101, and, determines in step S1211 whether or not the amount of Right margin 1101 is 0. The process in step S1210 will be described later. Here, if it is determined that the amount of Right margin 1101 is 0, the processing in FIG. 12 is ended. On the other hand, if it is determined that the amount of Right margin 1101 is not 0, the CPU 103 erases columns for the amount of Right margin 1101 in the scanning result in FIG. 11 from its right edge in step S1212, and the processing in FIG. 12 is then ended.

Scan data of the document size detected by the image processing apparatus 150 is extracted by the information processing apparatus 100 through the processing in FIG. 12.

Figure 13:
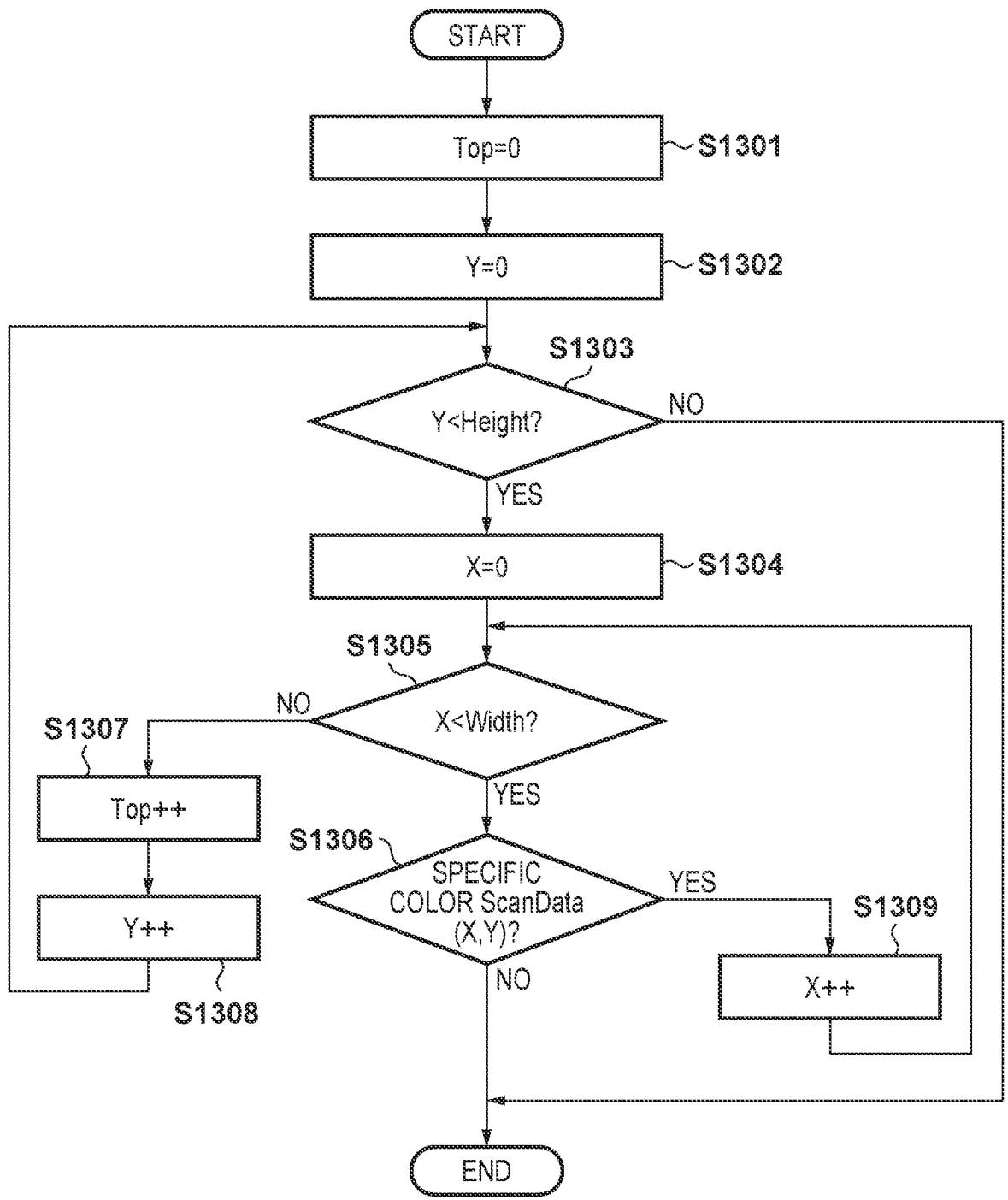
FIG. 13 is a flowchart showing processing for detecting a margin amount.

FIG. 13 is a flowchart showing the process in step S1201. In step S1301, the CPU 103 stores, in the storage region, a variable Top indicating the amount of a margin, and initializes the variable Top to 0. In step S1302, the CPU 103 stores, in the storage region, the variable Y indicating a position in the height direction, and initializes the variable Y to 0. The position indicated by the variable Y=0 corresponds to the upper edge of the scanning result in FIG. 11, for example.

In step S1303, the CPU 103 determines whether or not the current value of the variable Y is smaller than Height. Hereinafter, Height corresponds to Max Height in FIG. 4. If it is determined that the current value of the variable Y is larger than or equal to Height, in other words, when determination processing reaches the lower edge from the upper edge, the processing in FIG. 13 is ended. On the other hand, if it is determined that the current value of the variable Y is smaller than Height, the procedure advances to step S1304.

In step S1304, the CPU 103 stores, in the storage region, a variable X indicating a position in the width direction, and initializes the variable X to 0. The position indicated by the variable X=0 corresponds to the left edge of the scanning result in FIG. 11, for example.

In step S1305, the CPU 103 determines whether or not the current value of the variable X is smaller than Width. Hereinafter, Width corresponds to Max Width in FIG. 4. If it is determined that the current value of the variable X is smaller than Width, the procedure advances to step S1306, and the CPU 103 determines whether or not a color of a pixel of scan data at the coordinates (X,Y) is the specific color. If it is determined that the color is the specific color, the procedure advances to step S1309, where the CPU 103 increments the value of the variable X, and the process in step S1305 is repeated. On the other hand, if it is determined that the color is not the specific color, the processing in FIG. 13 is ended. "It is determined that the color is not the specific color" means that scan data of the document is present from this row.

If it is determined in step S1305 that the current value of the variable X is larger than or equal to Width, the CPU 103 increments the value of the variable Top in step S1307, and increments the value of the variable Yin step S1308, and the process in step S1303 is then repeated.

Figure 14:
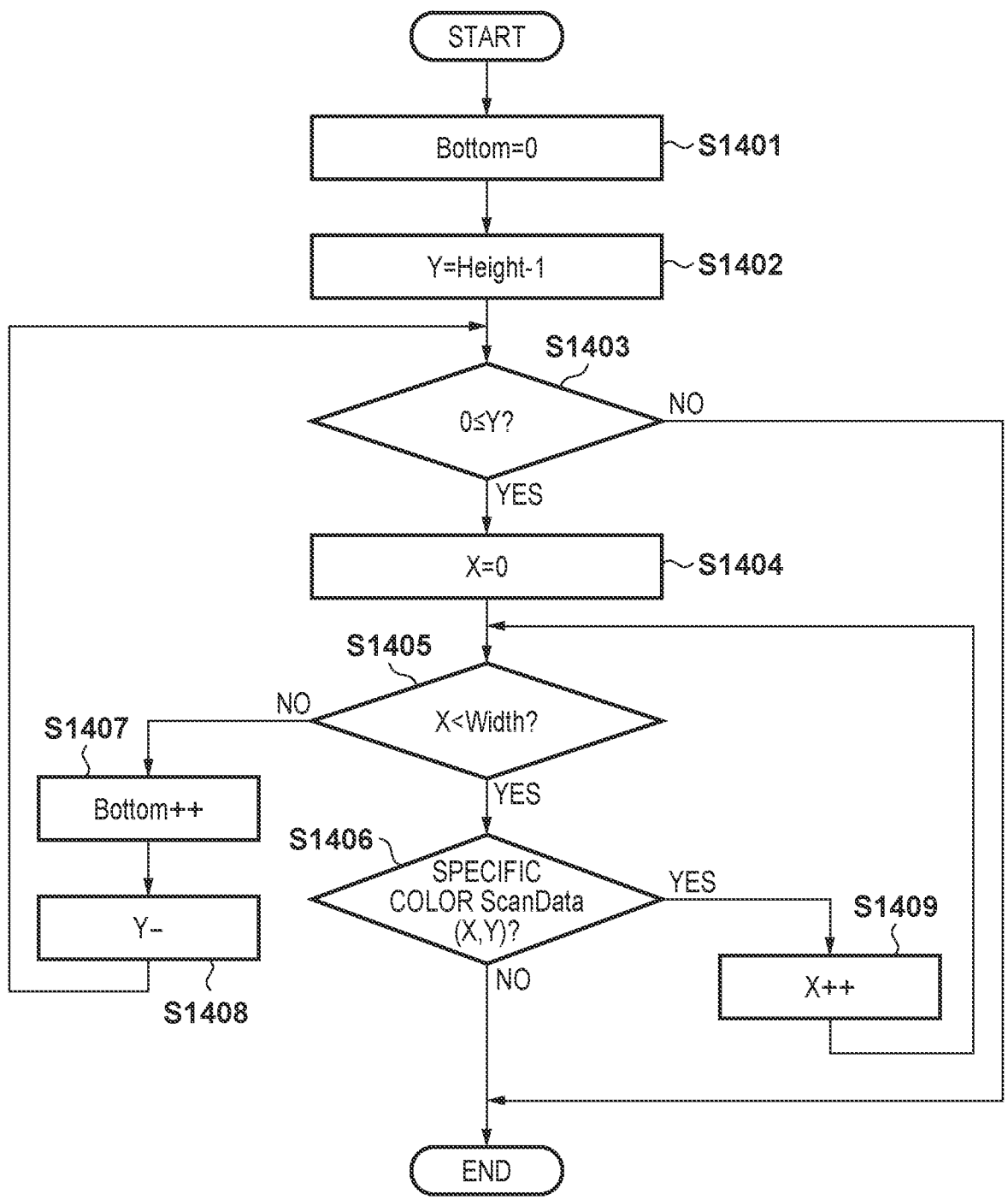
FIG. 14 is a flowchart showing processing for detecting a margin amount.

FIG. 14 is a flowchart showing the process in step S1204. In step S1401, the CPU 103 stores, in the storage region, a variable Bottom indicating the amount of a margin, and initializes the variable Bottom to 0. In step S1402, the CPU 103 stores, in the storage region, the variable Y indicating a position in the height direction, and initializes the variable Y to Height−1. The variable Y=Height−1 corresponds to the lower edge of the scanning result in FIG. 11, for example.

In step S1403, the CPU 103 determines whether or not the current value of the variable Y is larger than or equal to 0. If it is determined that the current value of the variable Y is not larger than or equal to 0, in other words, when determination processing reaches the upper edge from the lower edge, the processing in FIG. 14 is ended. On the other hand, if it is determined that the current value of the variable Y is larger than or equal to 0, the procedure advances to step S1404.

In step S1404, the CPU 103 stores, in the storage region, the variable X indicating a position in the width direction, and initializes the variable X to 0. The position indicated by the variable X=0 corresponds to the left edge of the scanning result in FIG. 11, for example.

In step S1405, the CPU 103 determines whether or not the current value of the variable X is smaller than Width. If it is determined that the current value of the variable X is smaller than Width, the procedure advances to step S1406, and the CPU 103 determines whether or not a color of a pixel of scan data at the coordinates (X,Y) is the specific color. If it is determined that the color is the specific color, the procedure advances to step S1409, where the CPU 103 increments the value of the variable X, and the process in step S1405 is repeated. On the other hand, if it is determined that the color is not the specific color, the processing in FIG. 14 is ended. "It is determined that the color is not the specific color" means that scan data of the document is present from the row.

If it is determined in step S1405 that the current value of the variable X is larger than or equal to Width, the CPU 103 increments the value of the variable Bottom in step S1407, and decrements the value of the variable Yin step S1408, and the process in step S1403 is then repeated.

Figure 15:
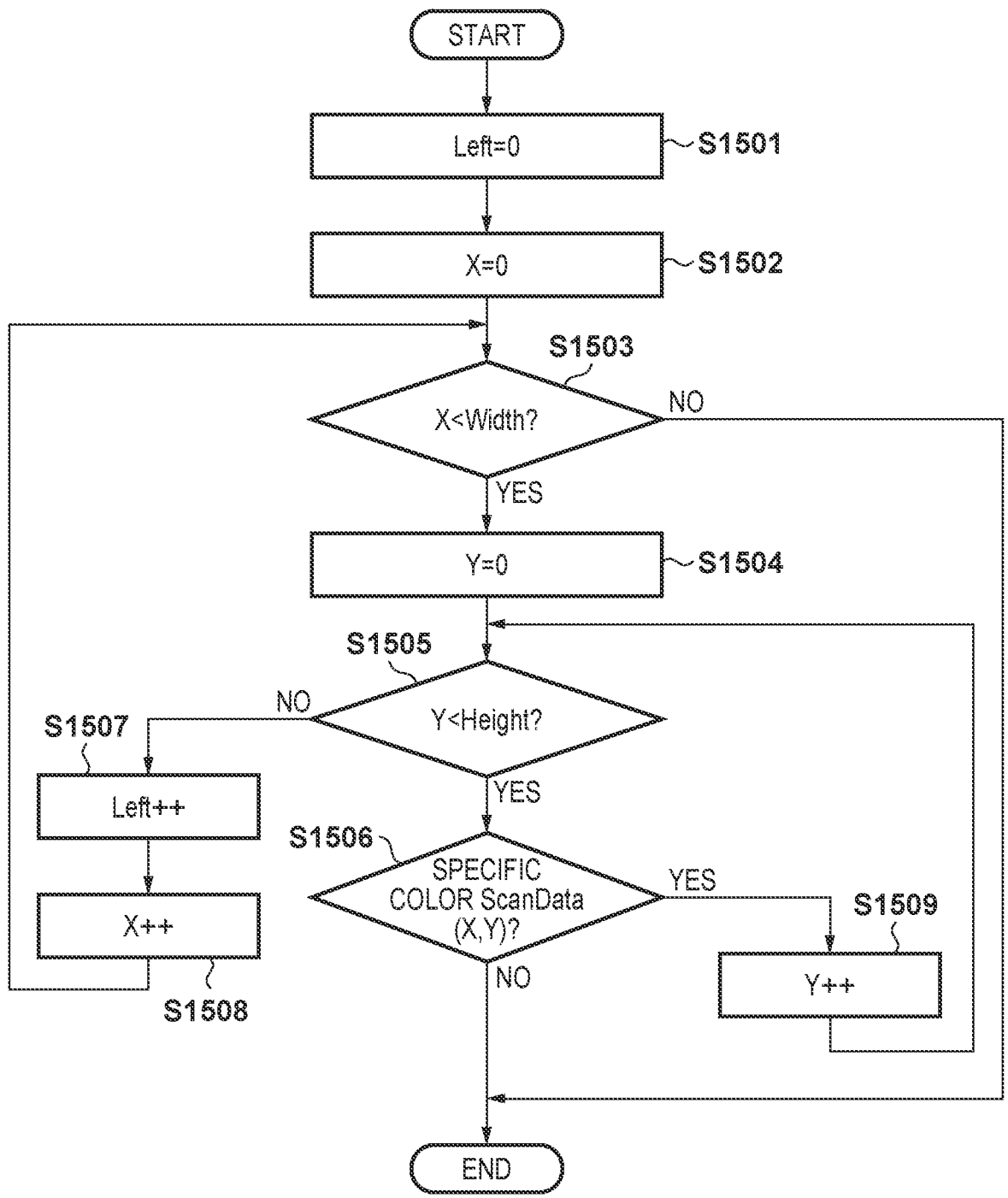
FIG. 15 is a flowchart showing processing for detecting a margin amount.

FIG. 15 is a flowchart showing the process in step S1207. In step S1501, the CPU 103 stores, in the storage region, a variable Left indicating the amount of a margin, and initializes the variable Left to 0. In step S1502, the CPU 103 stores, in the storage region, the variable X indicating a position in the width direction, and initialize the variable X to 0. The variable X=0 corresponds to the left edge of the scanning result in FIG. 11, for example.

In step S1503, the CPU 103 determines whether or not the current value of the variable X is smaller than Width. If it is determined that the current value of the variable X is larger than or equal to Width, in other words, when determination processing reaches the right edge from the left edge, the processing in FIG. 15 is ended. On the other hand, if it is determined that the current value of the variable X is smaller than Width, the procedure advances to step S1504.

In step S1504, the CPU 103 stores, in the storage region, the variable Y indicating a position in the height direction, and initializes the variable Y to 0. The position indicated by the variable Y=0 corresponds to the upper edge of the scanning result in FIG. 11, for example.

In step S1505, the CPU 103 determines whether or not the current value of the variable Y is smaller than Height. If it is determined that the current value of the variable Y is smaller than Height, the procedure advances to step S1506, and the CPU 103 determines whether or not a color of a pixel of scan data at the coordinates (X,Y) is the specific color. If it is determined that the color is the specific color, the procedure advances to step S1509, the CPU 103 increments the value of the variable Y, and the process in step S1505 is repeated. On the other hand, if it is determined that the color is not the specific color, the processing in FIG. 15 is ended. "It is determined that the color is not the specific color" means that scan data of the document is present from the column.

If it is determined in step S1505 that the current value of the variable Y is smaller than or equal to Height, the CPU 103 increments the value of the variable Left in step S1507, and increments the value of the variable X in step S1508, and the process in step S1503 is then repeated.

Figure 16:
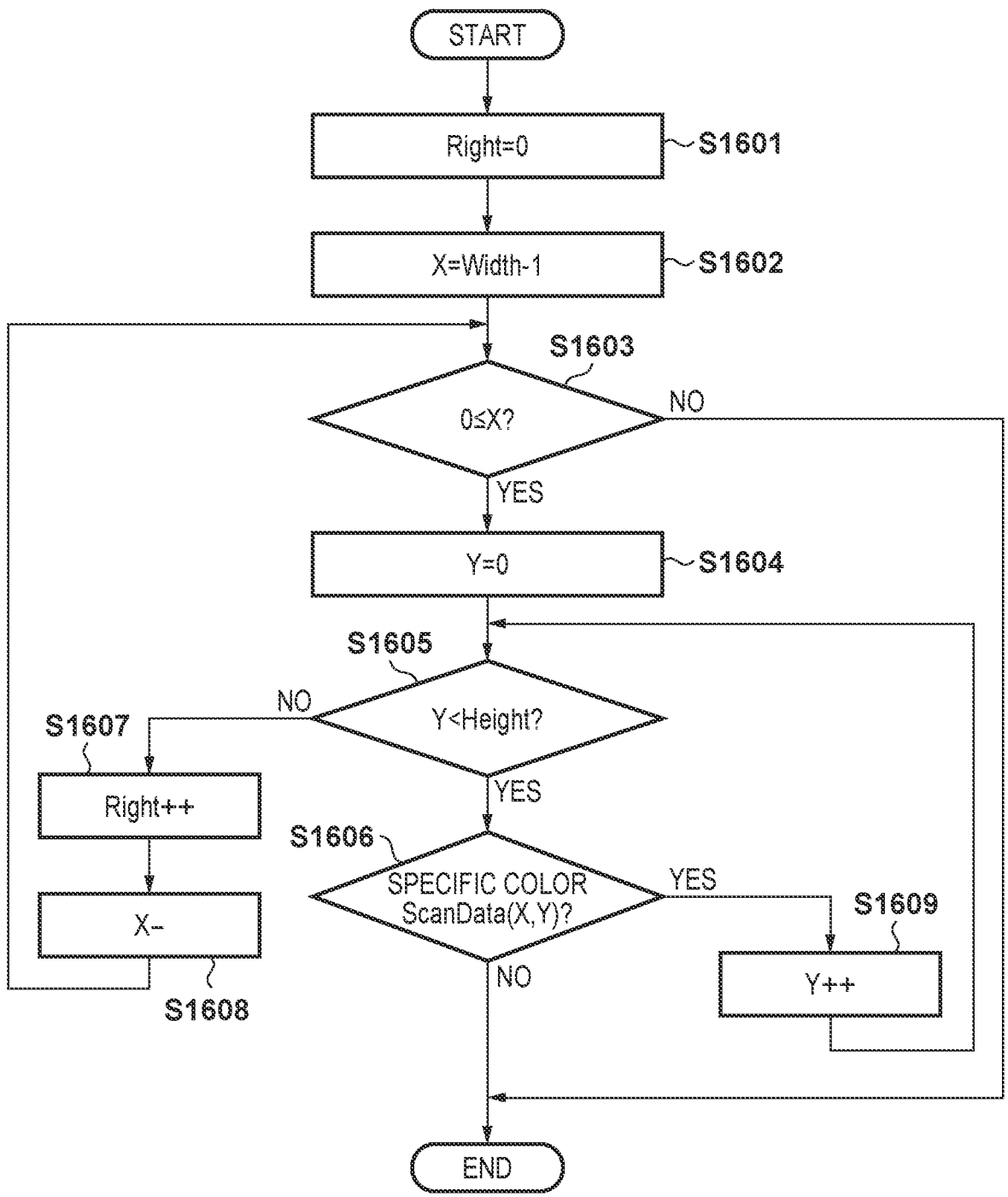
FIG. 16 is a flowchart showing processing for detecting a margin amount.

FIG. 16 is a flowchart showing the process in step S1210. In step S1601, the CPU 103 stores, in the storage region, a variable Right indicating the amount of a margin, and initializes the variable Right to 0. In step S1602, the CPU 103 stores, in the storage region, the variable X indicating a position in the width direction, and initializes the variable X to Width−1. The variable X=Width−1 corresponds to the right edge of the scanning result in FIG. 11, for example.

In step S1603, the CPU 103 determines whether or not the current value of the variable X is larger than or equal to 0. If it is determined that the current value of the variable X is not larger than or equal to 0, in other words, when determination processing reaches the left edge from the right edge, the processing in FIG. 16 is ended. On the other hand, if it is determined that the current value of the variable X is larger than or equal to 0, the procedure advances to step S1604.

In step S1604, the CPU 103 stores, in the storage region, the variable Y indicating a position in the height direction, and initializes the variable Y to 0. The position indicated by the variable Y=0 corresponds to the upper edge of the scanning result in FIG. 11, for example.

In step S1605, the CPU 103 determines whether or not the current value of the variable Y is smaller than Height. If it is determined that the current value of the variable Y is smaller than Height, the procedure advances to step S1606, and the CPU 103 determines whether or not a color of a pixel of scan data at the coordinates (X,Y) is the specific color. If it is determined that the color is the specific color, the procedure advances to step S1609, and the CPU 103 increments the value of the variable Y, and the process in step S1605 is repeated. On the other hand, if it is determined that the color is not the specific color, the processing in FIG. 16 is ended. "It is determined that the color is not the specific color" means that scan data of the document is present from the column.

If it is determined in step S1605 that the current value of the variable Y is smaller than or equal to Height, the CPU 103 increments the value of the variable Right in step S1607, and decrements the value of the variable X in step S1608, and the process in step S1603 is then repeated.

As described above, according to this embodiment, in the image processing apparatus 150, image data of a specific color is added to scan data in (a portion of) the periphery of a scanned document region, and image data of a scan request size made by the information processing apparatus 100 is obtained. The scan data to which the image data has been added is then transmitted to the information processing apparatus 100. With such a configuration, even if the image processing apparatus 150 does not have a function of extracting a document region, a document region can be extracted in the information processing apparatus 100 at accuracy corresponding to the accuracy at which a scan region is detected by the image processing apparatus 150.

The image data that is added as described above is then transmitted to the information processing apparatus 100 in the same data format as the image data of the document (without a particular command being given, for example). Accordingly, the information processing apparatus 100 does not need to distinguish the image data of the document and the added image data from each other, when receiving the image shown in FIG. 11. Subsequently, by executing the processing shown in FIG. 12 on the image shown in FIG. 11, the document region can be extracted. Therefore, in order to give notification of a document region from the image processing apparatus 150 to the information processing apparatus 100 (in other words, in order to perform notification of a result of a sensor detecting a document), any particular command or the like other than the processing for transmitting image data can be omitted. Therefore, as in the case of the standard driver 310, even if only the standard protocol 311 is implemented, as long as image data is received in accordance with the standard protocol 311, the information processing apparatus 100 can obtain an image in which the document region is extracted.

In addition, in the above-described example, data is transmitted to the information processing apparatus 100 one line at a time. However, the present invention is not limited thereto, and a configuration may also be adopted in which, after image data of a plurality of lines (for example, the entire image) is stored in the image processing apparatus 150, the image data is transmitted to the information processing apparatus 100. In this case, image data to be transmitted is transmitted as image data that includes a document region and an added portion, and corresponds to one image. Therefore, even if only the standard protocol 311 is implemented as in the case of the standard driver 310, the information processing apparatus 100 can obtain an image in which a document region is extracted.

Note that, in the above embodiment, a specific color is used as an image feature of an additional image, but the present invention is not limited thereto, and an image feature such as a pattern may also be used as an additional image. However, also in this case, as described above, an image feature that can be distinguished from a document region and is not largely different from an image feature when a document is not set is desirable.

Second Embodiment

In the first embodiment, the information processing apparatus 100 receives all of the scanning results, in other words, scanning results for a document region, from the image processing apparatus 150, and then performs the processing in FIG. 12. In this embodiment, in the information processing apparatus 100, the speed of processing can be increased by converting scan data output from the image processing apparatus 150 in units of lines, into scan data of a document size, in real time. Regarding the second embodiment, differences from the first embodiment will be described below.

Figure 17:
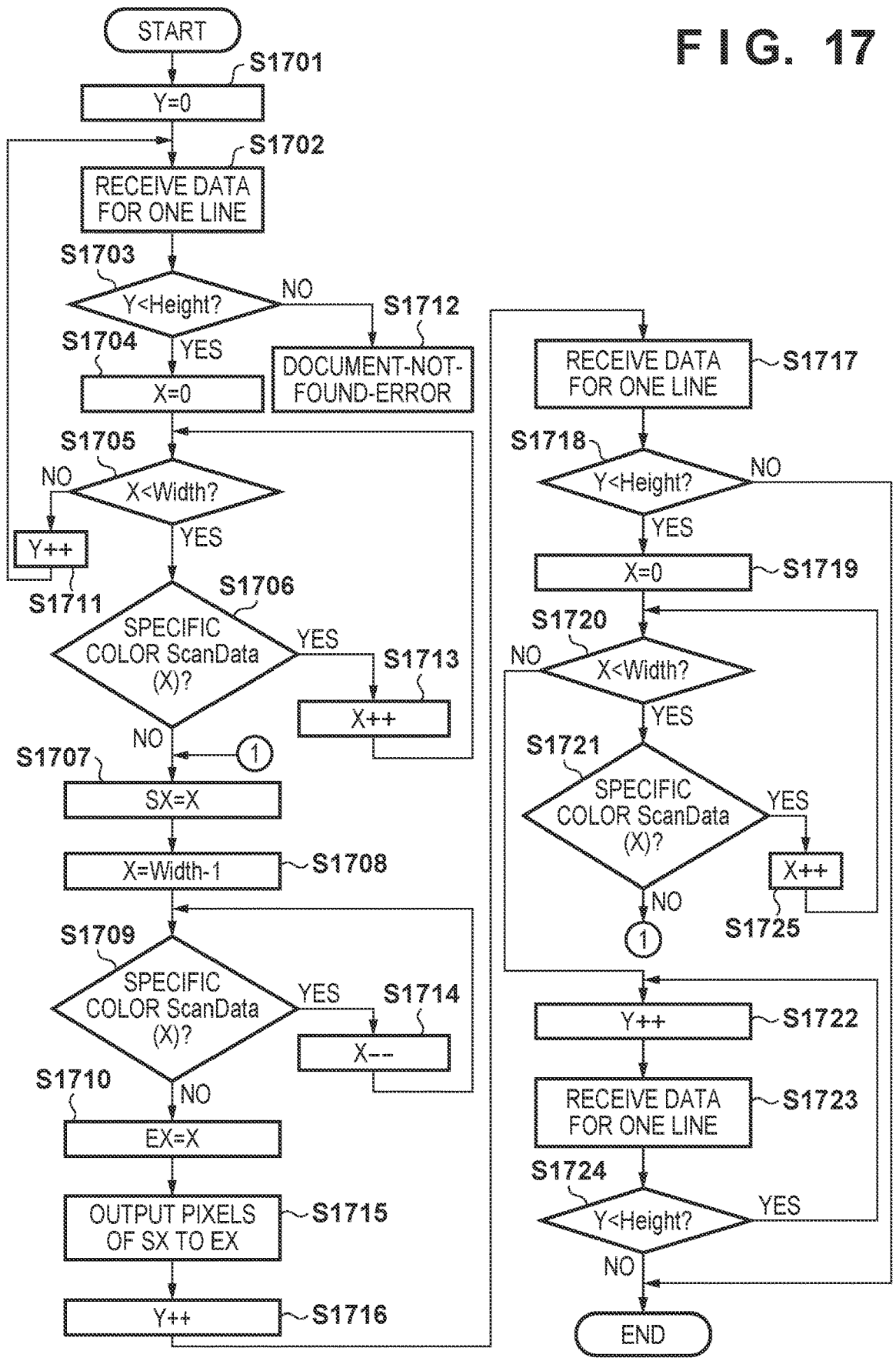
FIG. 17 is a flowchart showing processing of the information processing apparatus.

FIG. 17 is a flowchart showing processing that is performed in the information processing apparatus 100. The processing in FIG. 12 is realized by the CPU 103 loading a program stored in the ROM 104 to the RAM 105, and executing the program, for example.

In step S1701, the CPU 103 stores, in the storage region, the variable Y indicating a position in the height direction, and initializes the variable Y to 0. The position indicated by the variable Y=0 corresponds to the upper edge of the scanning result in FIG. 11, for example. In step S1702, the CPU 103 receives scan data for one line from the image processing apparatus 150, and, in step S1703, determines whether or not the current value of the variable Y is smaller than Height. Hereinafter, Height corresponds to Max Height in FIG. 4. If it is determined that the current value of the variable Y is larger than or equal to Height, it indicates that only the specific color has been detected and scan data of the document has not been detected, and thus, in step S1712, the CPU 103 processes this as a document-not-found-error, and the processing in FIG. 17 is then ended. On the other hand, if it is determined that the current value of the variable Y is smaller than Height, the procedure advances to step S1704.

In step S1704, the CPU 103 stores, in the storage region, the variable X indicating a position in the width direction, and initializes the variable X to 0. The position indicated by the variable X=0 corresponds to the left edge of the scanning result in FIG. 11, for example.

In step S1705, the CPU 103 determines whether or not the current value of the variable X is smaller than Width. Hereinafter, Width corresponds to Max Width in FIG. 4. If it is determined that the current value of the variable X is smaller than Width, the procedure advances to step S1706, and the CPU 103 determines whether or not a color of a pixel of scan data at coordinates (X,Y) is the specific color. If it is determined that the color is the specific color, the procedure advances to step S1713, where the CPU 103 increments the value of the variable X, and the process in step S1705 is repeated. On the other hand, if it is determined that the color is not the specific color, the procedure advances to step S1707, and the CPU 103 determines that scan data of the document is present on this row, and substitutes the value of the variable X at this time, into a variable SX that indicates a column in which scan data of the document starts. If it is determined in step S1705 that the current value of the variable X is larger than or equal to Width, the CPU 103 increments the value of the variable Y in step S1711, and the process in step S1702 is then repeated.

Next, in the process of step S1708 onward, determination processing from the opposite side of scan data on the same row as the row that is currently in focus (for example, the right edge of the scanning result in FIG. 11) is performed.

In step S1708, the CPU 103 substitutes Width−1 into the variable X. In step S1709, the CPU 103 determines whether or not a color of a pixel of scan data at the coordinates (X,Y) is the specific color. If it is determined that the color is the specific color, the procedure advances to step S1714, and the CPU 103 decrements the value of the variable X, and the process in step S1709 is repeated. On the other hand, if it is determined that the color is not the specific color, the procedure advances to step S1710, and the CPU 103 substitutes the value of the variable X at this time, into a variable EX indicating the last edge column of scan data of the document, and the procedure advances to step S1715. In step S1715, the CPU 103 outputs scan data from the position of SX specified in step S1707 to the position of EX specified in step S1710, and stores the scan data in the storage region.

As described above, when one edge (SX) of scan data of a document is detected from scan data received from the image processing apparatus 150, the information processing apparatus 100 performs processing for detecting the other edge (EX) through a scanning operation from the opposite side. With such a configuration, compared with determination processing that is performed sequentially in the same scanning direction from one edge (SX) in scan data of the document, scan data of the document (scan data from SX to EX) can be more efficiently extracted.

In step S1716, the CPU 103 increments the value of the variable Y, and, in step S1717, receives scan data for one line from the image processing apparatus 150. Subsequently, in step S1718, the CPU 103 determines whether or not the current value of the variable Y is smaller than Height. If it is determined that the current value of the variable Y is larger than or equal to Height, it indicates that determination processing has reached the lower edge from the upper edge, and thus the processing in FIG. 17 is ended. On the other hand, if it is determined that the current value of the variable Y is smaller than Height, the procedure advances to step S1719.

In step S1719, the CPU 103 initializes the variable X to 0. The position indicated by the variable X=0 corresponds to the left edge of the scanning result in FIG. 11, for example. In step S1720, the CPU 103 determines whether or not the current value of the variable X is smaller than Width. If it is determined that the current value of the variable X is smaller than Width, the procedure advances to step S1721, and the CPU 103 determines whether or not a color of a pixel of scan data at the coordinates (X,Y) is the specific color. If it is determined that the color is the specific color, the procedure advances to step S1725, the CPU 103 increments the value of the variable X, and the process in step S1720 is repeated. On the other hand, if it is determined that the color is not the specific color, the process in step S1707 onward is repeated.

If it is determined in step S1720 that the current value of the variable X is larger than or equal to Width, in other words, if scan data of the document for the row of interest could not be detected, the procedure advances to step S1722. In step S1722, the CPU 103 increments the variable Y, and, in step S1723, receives scan data for one line from the image processing apparatus 150. In step S1723, the CPU 103 reads and discards the received scan data for one line. Subsequently, in step S1724, the CPU 103 determines whether or not the current value of the variable Y is smaller than Height. Here, if it is determined that the current value of the variable Y is smaller than Height, the process of step S1722 onward is repeated. On the other hand, if it is determined that the current value of the variable Y is larger than or equal to Height, the processing in FIG. 17 is ended.

Accordingly, if scan data of the document could not be detected as a result of determination of scan data for one line, the scan data received from the image processing apparatus 150 is read and discarded (repeatedly) until it is determined in step S1724 that the current value of the variable Y is larger than or equal to Height.

As described above, according to this embodiment, if it is detected that scan data of the document is present in scan data received from the image processing apparatus 150 in units of lines, processing for detecting an edge portion of the document region is performed. Furthermore, if it is detected that scan data of the document is not present, scan data on the subsequent rows is received from the image processing apparatus 150, and read and discarded. As a result, in the information processing apparatus 100, it is possible to efficiently perform processing of conversion into scan data of the document size.

In this embodiment, if, in a document region, the specific color is exhibited in a boundary portion with a non-document region (for example, one pixel of the document region adjacent to the non-document region), there is a possibility that processing will not be appropriately performed. In order to prevent such a situation, a configuration may also be adopted in which, if a scan result of the specific color is detected in the aforementioned boundary portion in the document region by the image processing apparatus 150, the CPU 155 of the image processing apparatus 150 adds, in step S508 in FIG. 5, data of a color different from the specific color that has a width of the difference between maxX and the width of the document size, to the scan data obtained in step S506, and transmits the scan data to which the data has been added, to the information processing apparatus 100. For example, when (R,G,B)=(255,255,255) represents the specific color, one of the values is replaced with an approximate value, for example, (R,G,B)=(254,255, 255). In addition, a configuration may also be adopted in which, if a scan result of the specific color is detected in a boundary portion in the row direction of the document region (for example, one row in the document region adjacent to a non-document region) by the image processing apparatus 150, the CPU 155 of the image processing apparatus 150 replaces, for example, the value of scan data of one pixel in the row (for example, scan data of the leading pixel of the row) with a similar approximate value, in step S512 in the figure.

Third Embodiment

In the first and second embodiments, a document region and a non-document region are distinguished from each other based on a specific color. In this embodiment, a specific pattern is used for the distinguishing. Differences from the first and second embodiments will be described below.

In this embodiment, it is possible to reduce the frequency at which coincidental match of a specific color occurs between a document region and a non-document region, by using a specific pattern instead of a specific color. For example, when the deterioration of a scanner progresses, pixel values are easily saturated, and pure white is exhibited in many pixels as in the case of the specific color in the first and second embodiments. In addition, when coated paper or the like that has an extremely high reflective property is scanned, a scan result in which scan data is all while (saturated) can be output.

In cases such as that described above, when (R,G,B)= (255,255,255) is set as a specific color, there is a possibility that specific colors will match between a document region and a non-document region, causing an erroneous determination. In this embodiment, by using a specific pattern in which a plurality of colors are arranged, it is possible to prevent specific colors from matching between a document region and a non-document region.

In this embodiment, the image processing apparatus 150 and the information processing apparatus 100 share information regarding specific pattern arrangement. This information may be included in firmware in the image processing apparatus 150 or the application program 200 in the information processing apparatus 100, for example.

Figure 18:
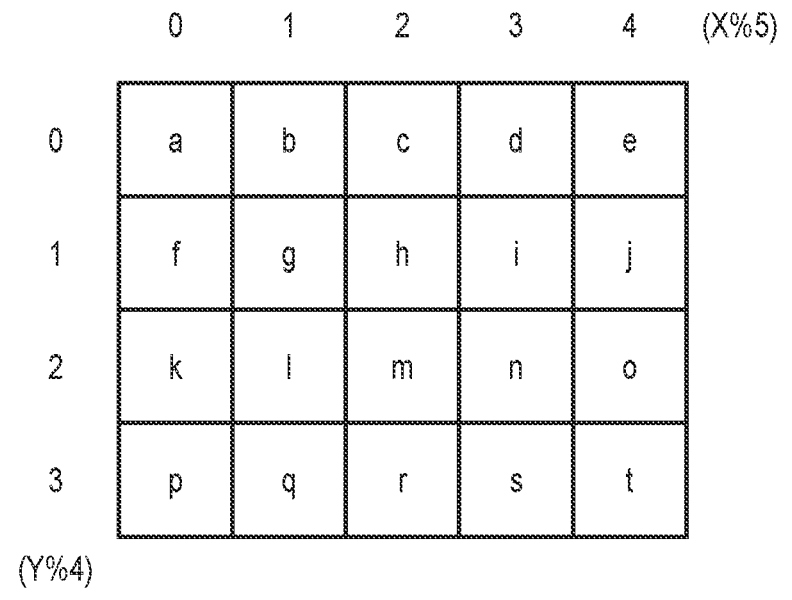

FIG. 18 is a diagram showing an example of a specific pattern. FIG. 18 shows pattern data of 5 pixels (width)×4 pixels (height) as a specific pattern. Accordingly, the color at a coordinate position (X,Y) of scan data is the same as a color of a component at an "X %5 (remainder of X)" th row and a "Y %4 (remainder of Y)" th column in the specific pattern in FIG. 18. For example, the value of a color of the specific pattern of scan data at a position (X,Y)=(100,50) is "c" that is a component on the 0th row and the 2nd column in FIG. 18, based on 100%5=0, 50%4=2.

The processing in the image processing apparatus 150 in this embodiment will be described below with reference to FIG. 5. Step S508 in this embodiment is different from step S508 in the processing in FIG. 5 that has been described already. In this embodiment, in step S508, data of a specific color is not added, but, instead, the color of a component of the specific pattern identified with remainders with respect to coordinate positions X and Y is added. Specifically, the color of a component of the specific pattern at the coordinate position Y of a row corresponding to the one line of the scan data obtained in step S507 and each coordinate position X from the edge portion of width A4X of the document size to Max Width is specified using the above-described remainder equation. Data of colors of components identified with coordinate positions (X,Y) is then added to the scan data obtained in step S507.

In addition, the processes of the information processing apparatus 100 in FIGS. 13 to 16 are different from the processes that have been already described, as follows.

Specifically, in step S1306 in FIG. 13, not a determination as to whether or not a color of a pixel of scan data at the coordinates (X,Y) is the specific color, but a determination is made as to whether or not it is the color of a component of the specific pattern identified with a coordinate position (X,Y) and the remainder equation. The same applies to step S1406 in FIG. 14, step S1506 in FIG. 15, and step S1606 in FIG. 16.

FIG. 19 is a diagram showing an example of a scanning result when a specific pattern is used for identification. Regarding the specific pattern, even if a color included in the specific pattern is accidentally exhibited in the document region, if the pattern in the peripheral area of the color does not match, such a result of the color exhibition is ignored, and the pixel of the exhibited color is determined as belonging to the document region. For example, data of a "t" color that is a component of the specific pattern is exhibited at a pixel in the 3rd row and the 4th column in FIG. 19. However, if a determination result of peripheral pixels of the pixel of the "t" color does not match the colors of components of the specific pattern, the pixel in which data of the "t" color is exhibited is also determined as belonging to the document region.

Since such processing is adopted, if, for example, it is determined in step S1306 in FIG. 13 that the color of the pixel of scan data at the coordinate position (X,Y) is a color of a component of the specific pattern, a result at the same X-coordinate position in processed scan data in a Y—1st row, for example, a pixel at the 2nd row and 4th column is referenced in the above-described example. If a determination result of the X-coordinate position does not match any color of the specific pattern (in the above-described example, if the color is not o color), determination result of the color at the current coordinate position (X,Y) matching a color of the specific pattern is ignored, and it is determined as belonging to the document region. In addition, the present invention is not limited to the above-described method, and another method may be used in which a determination result is referenced for each group of a plurality of pixels, and, if a predetermined number of continuous pixels match, in color, components of the specific pattern, the pixels are determined as belonging to a non-document region, or the like.

The present invention is not limited to the above embodiments, and various modifications and deformations can be made without departing from the gist and scope of the present invention. Therefore, claims are attached in order to publicize the scope of the present invention.

Other Embodiments

Embodiment (s) of the present invention can also be realized by a computer of a system or apparatus that reads out and executes computer executable instructions (e.g., one or more programs) recorded on a storage medium (which may also be referred to more fully as a non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-068565, filed Mar. 29, 2019, which is hereby incorporated by reference herein in its entirety.

What is claimed is:

1. An image processing method that is performed by an information processing apparatus and an image processing apparatus, the image processing method comprising:

reading, by the image processing apparatus, a document when a read instruction in which a predetermined image size is specified is received from the information processing apparatus;

detecting, by the image processing apparatus, at least one of a width and a height of the document;

adding, by the image processing apparatus, a first image that includes a predetermined image feature, to a read image of the document based on a detection result in the detecting;

transmitting, by the image processing apparatus, a second image of the predetermined image size specified in the read instruction, to the information processing apparatus; and obtaining, by the information processing apparatus, the read image of the document included in the second image transmitted in the transmitting, wherein, in the adding, the image processing apparatus adds the first image such that in the second image the first image is provided on the outside of the read image of the document, based on at least one of a width and a height of the document detected in the detection, and in the obtaining, the information processing apparatus obtains the read image of the document based on the predetermined image feature.

2. The image processing method according to claim 1, wherein the information processing apparatus obtains the read image of the document from the second image using an application program.

3. The image processing method according to claim 1, wherein the predetermined image feature is a specific color.

4. The image processing method according to claim 1, wherein the predetermined image feature is a pattern that includes a plurality of colors.

5. The image processing method according to claim 1, wherein transmission of the second image in the transmitting is performed as a result of repeatedly transmitting a portion of the second image.

6. The image processing method according to claim 5, wherein, in the obtaining, the information processing apparatus obtains the read image of the document after receiving the second image which includes the first image.

7. The image processing method according to claim 5, wherein, in the obtaining, upon receiving a portion of the second image, the information processing apparatus obtains image data included in the read image of the document, from read data of the portion.

8. The image processing method according to claim 7, wherein the information processing apparatus determines whether or not a portion of the second image includes data included in the read image of the document, and, in the obtaining, if it is determined, in the determining, that the portion includes data included in the read image of the document, the information processing apparatus obtains the data.

9. The image processing method according to claim 8, wherein, in the determining, the information processing apparatus determines whether or not the portion received from the image processing apparatus includes data included in the read image of the document, based on whether or not there is data corresponding to an end portion of the document.

10. The image processing method according to claim 1, wherein the information processing apparatus includes a first software provided by an operating system of the information processing apparatus and a second software provided by a vendor, and communicates with the image processing apparatus via the first software and the second software, and the image that includes the predetermined image feature is added when the image processing apparatus receives the read instruction via the first software.

11. An image processing apparatus that can communicate with an information processing apparatus that obtains a read image of a document from an image based on a predetermined image feature, the image processing apparatus comprising:

a reading unit configured to read the document when a read instruction in which a predetermined image size is specified is received from the information processing apparatus;

a detection unit configured to detect at least one of a width and a height of the document; and a transmission unit configured to add a first image that includes the predetermined image feature, to the read image of the document based on a detection result of the detection unit, and transmitting a second image of the predetermined image size specified in the read instruction, to the information processing apparatus, wherein the transmission unit adds the image that includes the first image such that in the second image the first image is provided on the outside of the read image of the document, based on at least one of a width and a height of the document detected by the detection unit.

12. An image processing system that includes an information processing apparatus and an image processing apparatus, wherein the image processing apparatus includes:

a reading unit configured to read a document when a read instruction in which a predetermined image size is specified is received from the information processing apparatus, a detection unit configured to detect at least one of a width and a height of the document, and a transmission unit configured to add a first image that includes a predetermined image feature, to a read image of the document based on a detection result of the detection unit, and transmitting a second image of the predetermined image size specified in the read instruction, to the information processing apparatus, and the information processing apparatus includes an obtaining unit configured to obtain the read image of the document included in the second image transmitted by the transmission unit, and in the adding performed by the transmission unit, the image processing apparatus adds the first image such that in the second image the first image is provided on the outside of the read image of the document, based on at least one of a width and a height of the document detected by the detection unit, and in the obtaining performed by the obtaining unit, the information processing apparatus obtains the read image of the document based on the predetermined image feature.

13. The image processing system according to claim 12, wherein the information processing apparatus obtains the read image of the document from the second image using an application program.

14. The image processing system according to claim 12, wherein the predetermined image feature is a specific color.

15. The image processing system according to claim 12, wherein the predetermined image feature is a pattern that includes a plurality of colors.

16. The image processing system according to claim 12, wherein the transmission of the second image in the transmitting performed by the transmission unit is performed as a result of repeatedly transmitting a portion of the second image.

17. The image processing system according to claim 16, wherein, in the obtaining performed by the obtaining unit, the information processing apparatus obtains the read image of the document after receiving the second image which includes the first image.

18. The image processing system according to claim 16, wherein, in the obtaining performed by the obtaining unit, upon receiving a portion of the second image, the information processing apparatus obtains image data included in the read image of the document, from read data of the portion.

19. The image processing system according to claim 18, wherein the information processing apparatus further includes a determination unit configured to determine whether or not a portion of the second image includes data included in the read image of the document, and, in the obtaining performed by the obtaining unit, if it is determined, in the determination performed by the determination unit, that the portion includes data included in the read image of the document, the information processing apparatus obtains the data.

20. The image processing system according to claim 19, wherein, in the determining performed by the determination unit, the information processing apparatus determines whether or not the portion received from the image processing apparatus includes data included in the read image of the document, based on whether or not there is data corresponding to an end portion of the document.

21. The image processing system according to claim 12, wherein the information processing apparatus includes a first software provided by an operating system of the information processing apparatus and a second software provided by a vendor, and communicates with the image processing apparatus via the first software and the second software, and the image that includes the predetermined image feature is added when the image processing apparatus receives the read instruction via the first software.

\* \* \* \* \*